United States Patent
Noh et al.

(10) Patent No.: US 11,979,833 B2
(45) Date of Patent: May 7, 2024

(54) METHOD AND DEVICE FOR REPORTING CHANNEL STATE INFORMATION IN WIRELESS COMMUNICATION SYSTEM

(71) Applicant: Samsung Electronics Co., Ltd., Gyeonggi-do (KR)

(72) Inventors: Hoondong Noh, Gyeonggi-do (KR); Taehyoung Kim, Gyeonggi-do (KR); Heecheol Yang, Gyeonggi-do (KR); Jinhyun Park, Gyeonggi-do (KR); Youngrok Jang, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 166 days.

(21) Appl. No.: 17/629,550

(22) PCT Filed: Jul. 13, 2020

(86) PCT No.: PCT/KR2020/009212
§ 371 (c)(1),
(2) Date: Jan. 24, 2022

(87) PCT Pub. No.: WO2021/015475
PCT Pub. Date: Jan. 28, 2021

(65) Prior Publication Data
US 2022/0256458 A1 Aug. 11, 2022

(30) Foreign Application Priority Data
Jul. 24, 2019 (KR) .......................... 10-2019-0089793

(51) Int. Cl.
*H04W 52/02* (2009.01)
*H04L 25/02* (2006.01)
(Continued)

(52) U.S. Cl.
CPC ..... *H04W 52/0229* (2013.01); *H04L 25/0224* (2013.01); *H04W 72/1263* (2013.01); *H04W 72/54* (2023.01)

(58) Field of Classification Search
CPC ............. H04W 52/0229; H04W 72/54; H04W 72/1263; H04L 25/0224
(Continued)

(56) References Cited

U.S. PATENT DOCUMENTS

2015/0117284 A1    4/2015  Baldemair et al.
2021/0195517 A1*   6/2021  Yang ................. H04W 52/0229

FOREIGN PATENT DOCUMENTS

KR    1020200127808    11/2020

OTHER PUBLICATIONS

R1-1906696, "Discussion on cross-slot scheduling for power saving", source LG Electronics (Year: 2019).*
(Continued)

*Primary Examiner* — Intekhaab A Siddiquee
(74) *Attorney, Agent, or Firm* — The Farrell Law Firm, P.C.

(57) ABSTRACT

In a wireless communication system, a terminal transmits capability information about power saving of the terminal to a base station, determines whether to apply a power saving interval based on resource allocation information received from the base station, determines a channel estimation method and a channel state information generation method based on the determining to apply the power saving interval, and provides, to the base station, channel state information obtained based on the determined channel estimation method and channel state information generation method.

15 Claims, 17 Drawing Sheets

(51) Int. Cl.
*H04W 72/1263* (2023.01)
*H04W 72/54* (2023.01)

(58) Field of Classification Search
USPC .......................................................... 370/318
See application file for complete search history.

(56) References Cited

OTHER PUBLICATIONS

R1-1906548, "Design of PDCCH-based power saving signal/channel for NR", source MediaTek Inc. (Year: 2019).*
LG Electronics, "Discussion on Cross-slot Scheduling for Power Saving", R1-1906696, 3GPP TSG RAN WG1 Meeting #97, May 13-17, 2019, 5 pages.
MediaTek Inc., "Design of PDCCH-based Power Saving Signal/Channel for NR", R1-1906548, 3GPP TSG RAN WG1 Meeting #97, May 13-17, 2019, 16 pages.
Samsung, "On Supporting Wake-up Signal", R2-1907849, 3GPP TSG-RAN WG2#106, May 13-17, 2019, 3 pages.
3GPP, 3rd Generation Partnership Project; Technical Specification Group Radio Access Network; NR; Study on User Equipment (UE) Power Saving in NR (Release 16), 3GPP TR 38.840 V16.0.0, Jun. 2019, 74 pages.
International Search Report dated Oct. 21, 2020 issued in counterpart application No. PCT/KR2020/009212, 18 pages.

* cited by examiner

METHOD AND DEVICE FOR REPORTING CHANNEL STATE INFORMATION IN WIRELESS COMMUNICATION SYSTEM

PRIORITY

This application is a National Phase Entry of PCT International Application No. PCT/KR2020/009212, which was filed on Jul. 13, 2020, and claims priority to Korean Patent Application No. 10-2019-0089793, which was filed on Jul. 24, 2019, the entire content of each of which is incorporated herein by reference.

TECHNICAL FIELD

The disclosure relates to a wireless communication system, and more particularly, to a method and apparatus for reporting channel state information in a wireless communication system.

BACKGROUND ART

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post Long Term Evolution (post-LTE)' systems. To achieve high data rates, implementation of 5G communication systems in an ultra-high frequency or millimeter-wave (mmWave) band (e.g., a 60 GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server or the like. To implement the IoT, various technological elements such as sensing technology, wired/wireless communication and network infrastructure, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

As various services may be provided according to the foregoing and the development of wireless communication systems, methods for smoothly providing such services are required. Particularly, in order to provide a service to a user for a longer period, a communication method for saving the power of a terminal and a channel state information reporting method considering this are required.

DESCRIPTION OF EMBODIMENTS

Technical Problem

The disclosure relates to a method, performed by a terminal, of providing channel state information in a wireless communication system. The method includes transmitting capability information about power saving of the terminal to a base station, determining whether to apply a power saving interval based on resource allocation information received from the base station, determining a channel estimation method and a channel state information generation method based on the determining to apply the power saving interval, and providing, to the base station, channel state information obtained based on the determined channel estimation method and channel state information generation method.

BEST MODE

Figure 1:
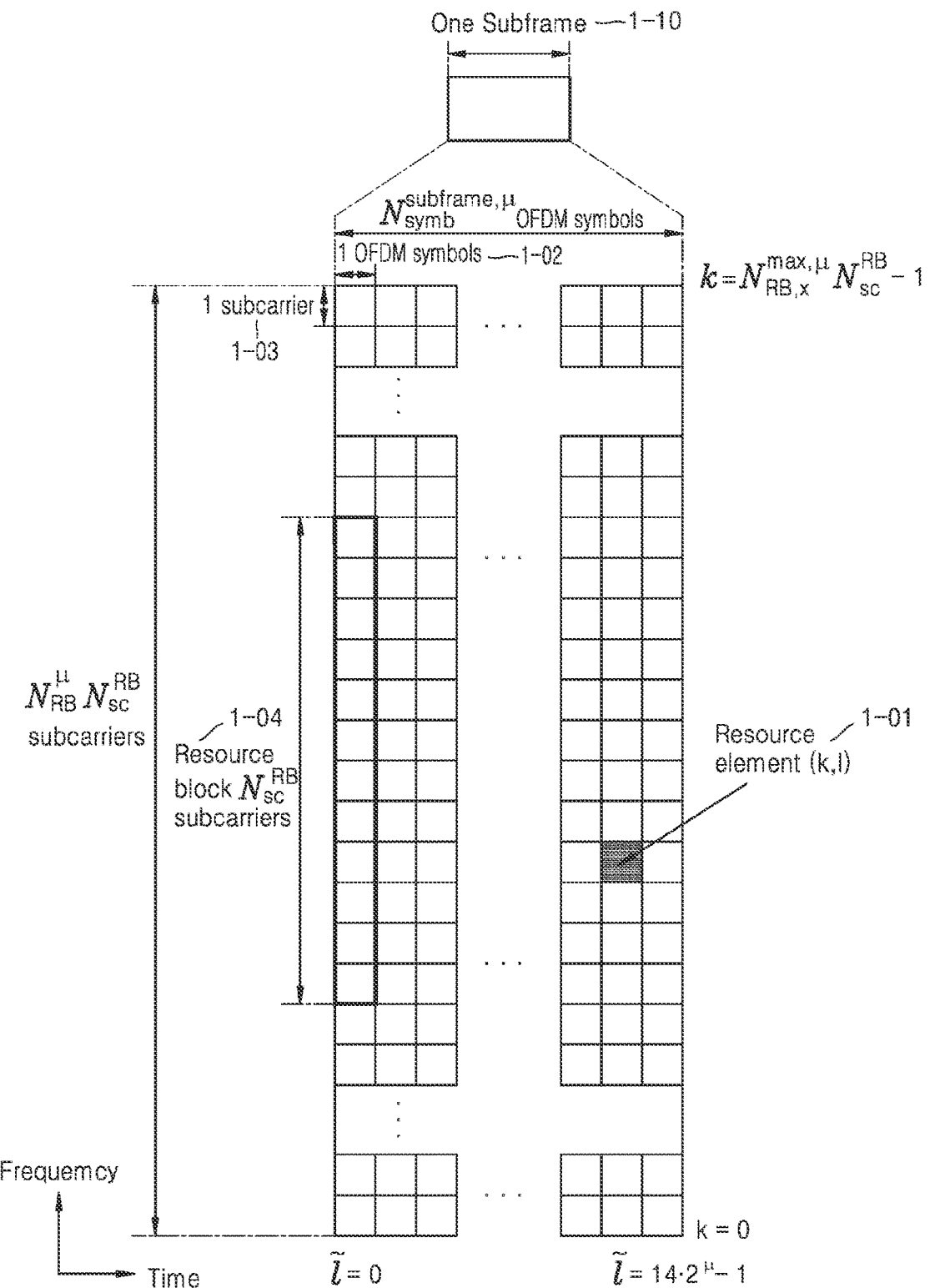
FIG. 1 is a diagram illustrating a basic structure of a time-frequency domain that is a radio resource region of a wireless communication system, according to an embodiment of the disclosure.

According to an embodiment of the disclosure, provided is a method, performed by a terminal, of providing channel state information in a wireless communication system. The method includes: transmitting capability information about power saving of the terminal to a base station; determining whether to apply a power saving interval based on resource allocation information received from the base station; determining a channel estimation method and a channel state information generation method based on the determining to apply the power saving interval; and providing, to the base station, channel state information obtained based on the determined channel estimation method and channel state information generation method.

The method may further include: determining, according to the determining regarding the channel estimation method and the channel state information generation method, that a report associated with an aperiodic channel state information reference signal (CSI-RS) among the aperiodic CSI-RS, a periodic CSI-RS, and a semi-persistent CSI-RS is not valid; and obtaining channel state information based on the periodic CSI-RS and the semi-persistent CSI-RS.

The method may further include: receiving, from the base station, signaling indicating deactivation of the periodic CSI-RS or the semi-persistent CSI-RS; and omitting, when the signaling is received through a physical downlink control channel (PDCCH), channel estimation based on the periodic CSI-RS or the semi-persistent CSI-RS and omitting, when the signaling is received through a physical downlink shared channel (PDSCH), feedback on the PDSCH.

The method may further include omitting, as the power saving interval is applied, channel estimation based on a CSI-RS received in the power saving interval.

The method may further include: identifying a PDCCH candidate interval for particular downlink control information (DCI) scrambled by a system information radio network temporary identifier (SI-RNTI), a random access (RA)-RNTI, or a paging (P)-RNTI; and performing, when a minimum offset is not applied, channel estimation based on a CSI-RS received in the power saving interval and omitting, when the minimum offset is applied, channel estimation based on a CSI-RS received in the power saving interval.

The method may further include omitting, when an aperiodic CSI-RS is triggered based on a group common DCI, channel estimation based on the aperiodic CSI-RS in the power saving interval and performing, when the aperiodic CSI-RS is triggered based on user equipment (UE)-specific DCI, channel estimation based on the aperiodic CSI-RS. The method may further include determining, as a CSI reference resource, a symbol not overlapping a measurement gap among at least one downlink symbol configured through higher layer signaling, wherein the providing of the channel state information may include providing channel state information at a time not later than the CSI reference resource, based on at least one CSI-RS received in an interval other than the power saving interval.

The method may further include determining, when configured to transmit a channel report to the base station, an interval from a symbol next a last symbol occupied by the power saving interval to a last symbol of a physical uplink shared channel (PUSCH) configured with the channel report as a central processing unit (CPU) occupation time.

The method may further include: identifying a resource of a first-transmitted CSI-RS, CSI-interference measurement (IM), or synchronization signal (SS)/physical broadcast channel (PBCH) block (SSB) with respect to a latest CSI-RS, CSI-IM, or SSB before the CSI reference resource in an interval excluding the power saving interval; and determining an interval from the identified resource to a last symbol of a physical uplink control channel (PUCCH) or physical uplink shared channel (PUSCH) configured with the channel report as a CPU occupation time.

The method may further include: identifying a resource of a first-transmitted CSI-RS, CSI-IM, or SSB with respect to a latest CSI-RS, CSI-IM, or SSB before the CSI reference resource in an interval excluding the power saving interval; and determining an interval from the identified resource to a last symbol before the power saving interval as a CPU occupation time.

The method may further include: identifying an interval from a first symbol of a first-transmitted CSI-RS, CSI-IM, or SSB to a last symbol of a latest-transmitted CSI-RS, CSI-IM, or SSB for a channel state report in an uplink slot indicated for a channel state report from the base station; and determining a CPU occupation time by changing a length of the identified interval based on a length of the power saving interval when the power saving interval is in the identified interval.

According to an embodiment of the disclosure, provided is a method, performed by a base station, of providing channel state information in a wireless communication system. The method includes: receiving capability information about power saving of a terminal; determining whether to apply a power interval based on the received capability information; determining a channel estimation method and a channel state information generation method based on the determining to apply the power saving interval; and receiving channel state information obtained from the terminal based on the determined channel estimation method and channel state information generation method.

According to an embodiment of the disclosure, provided is a terminal for providing channel state information in a wireless communication system. The terminal includes: a memory; a transceiver; and at least one processor configured to transmit capability information about power saving of the terminal to a base station, determine whether to apply a power saving interval based on resource allocation information received from the base station, determine a channel estimation method and a channel state information generation method based on the determining to apply the power saving interval, and provide, to the base station, channel state information obtained based on the determined channel estimation method and channel state information generation method.

The at least one processor may be configured to determine, according to the determining regarding the channel estimation method and the channel state information generation method, that a report associated with an aperiodic channel state information reference signal (CSI-RS) among the aperiodic CSI-RS, a periodic CSI-RS, and a semi-persistent CSI-RS is not valid, and obtain channel state information based on the periodic CSI-RS and the semi-persistent CSI-RS.

The at least one processor may be configured to receive, from the base station, signaling indicating deactivation of the periodic CSI-RS or the semi-persistent CSI-RS, and omit, when the signaling is received through a physical downlink control channel (PDCCH), channel estimation based on the periodic CSI-RS or the semi-persistent CSI-RS and omit, when the signaling is received through a physical downlink shared channel (PDSCH), feedback on the PDSCH.

The at least one processor may be configured to omit, as the power saving interval is applied, channel estimation based on a CSI-RS received in the power saving interval.

The at least one processor may be configured to identify a PDCCH candidate interval for particular downlink control information (DCI) scrambled by a system information radio network temporary identifier (SI-RNTI), a random access (RA)-RNTI, or a paging (P)-RNTI, and perform, when a minimum offset is not applied, channel estimation based on a CSI-RS received in the power saving interval and omit, when the minimum offset is applied, channel estimation based on a CSI-RS received in the power saving interval.

The at least one processor may be configured to omit, when an aperiodic CSI-RS is triggered based on a group common DCI, channel estimation based on the aperiodic CSI-RS in the power saving interval, and perform, when the aperiodic CSI-RS is triggered based on user equipment (UE)-specific DCI, channel estimation based on the aperiodic CSI-RS.

The at least one processor may be configured to determine, as a CSI reference resource, a symbol not overlapping a measurement gap among at least one downlink symbol configured through higher layer signaling, and provide channel state information at a time not later than the CSI reference resource, based on at least one CSI-RS received in an interval other than the power saving interval.

The at least one processor may be configured to determine, when configured to transmit a channel report to the base station, an interval from a symbol next a last symbol occupied by the power saving interval to a last symbol of a physical uplink shared channel (PUSCH) configured with the channel report as a central processing unit (CPU) occupation time.

The at least one processor may be configured to identify a resource of a first-transmitted CSI-RS, CSI-interference measurement (IM), or synchronization signal (SS)/physical broadcast channel (PBCH) block (SSB) with respect to a latest CSI-RS, CSI-IM, or SSB before the CSI reference resource in an interval excluding the power saving interval, and determine an interval from the identified resource to a last symbol of a physical uplink control channel (PUCCH) or physical uplink shared channel (PUSCH) configured with the channel report as a CPU occupation time.

The at least one processor may be configured to identify a resource of a first-transmitted CSI-RS, CSI-IM, or SSB with respect to a latest CSI-RS, CSI-IM, or SSB before the CSI reference resource in an interval excluding the power saving interval, and determine an interval from the identified resource to a last symbol before the power saving interval as a CPU occupation time.

The at least one processor may be configured to identify an interval from a first symbol of a first-transmitted CSI-RS, CSI-IM, or SSB to a last symbol of a latest-transmitted CSI-RS, CSI-IM, or SSB for a channel state report in an uplink slot indicated for a channel state report from the base station, and determine a CPU occupation time by changing a length of the identified interval based on a length of the power saving interval when the power saving interval is in the identified interval.

According to an embodiment of the disclosure, provided is a base station for providing channel state information in a wireless communication system. The base station includes: a memory; a transceiver; and at least one processor configured to control the transceiver to receive capability information about power saving of a terminal, determine whether to apply a power interval based on the received capability information, determine a channel estimation method and a channel state information generation method based on the determining to apply the power saving interval, and control the transceiver to receive channel state information obtained from the terminal based on the determined channel estimation method and channel state information generation method.

MODE OF DISCLOSURE

Hereinafter, embodiments of the disclosure will be described in detail with reference to the accompanying drawings.

In describing the embodiments of the disclosure, descriptions of technical contents that are well known in the technical field to which the disclosure belongs and are not directly related to the disclosure will be omitted. This is to more clearly convey the subject matter of the disclosure without obscuration thereof by omitting unnecessary descriptions thereof.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

Advantages and features of the disclosure and methods of achieving the same will be apparent from the embodiments of the disclosure described below in detail with reference to the accompanying drawings. The disclosure may, however, be embodied in many different forms and should not be construed as being limited to the embodiments of the disclosure described below; rather, these embodiments are provided to complete the disclosure and fully convey the scope of the disclosure to those of ordinary skill in the art and the disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-usable or computer-readable memory that may be directed to a computer or other programmable data processing equipment to implement a function in a particular manner, the instructions stored in the computer-usable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "~unit" used in the present embodiment of the disclosure may refer to a software component or a hardware component such as a field programmable gate array (FPGA) or an application specific integrated circuit (ASIC) and the "~unit" may perform certain functions. However, the "~unit" is not limited to software or hardware. The "~unit" may be configured to be in an addressable storage medium or may be configured to operate one or more processors. Thus, according to some embodiments, the "~unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "~units" may be associated with the smaller number of components and "~units" or may be further divided into additional components and "~units". In addition, the components and "~units" may be implemented to operate one or more central processing units (CPUs) in a device or a security multimedia card. Also, according to some embodiments, the "~unit" may include one or more processors.

Hereinafter, embodiments of the disclosure will be described in detail with reference to the accompanying drawings. In the following description of the disclosure, detailed descriptions of well-known functions or configurations will be omitted because they would unnecessarily obscure the subject matters of the disclosure. Also, terms described below may be terms defined considering functions in the disclosure and may vary according to users' or operators' intentions or practices. Therefore, the definition thereof should be made based on the content throughout the specification. Hereinafter, a base station may be an agent performing terminal resource allocation and may be at least one of a gNode B, an eNode B, a Node B, a base station (BS), a radio access unit, a base station controller, or a node on a network. Examples of the terminal may include a user equipment (UE), a mobile station (MS), a cellular phone, a smartphone, a computer, or a multimedia system capable of performing a communication function. However, the disclosure is not limited thereto. Hereinafter, the disclosure provides technology for a terminal to receive broadcast information from a base station in a wireless communication system. The disclosure relates to a communication method and system for convergence of $5^{th}$ generation (5G) communication systems and Internet of things (IoT) technology to support higher data rates after $4^{th}$ generation (4G) communication systems. The disclosure is applicable to intelligent services (e.g., smart home, smart building, smart city, smart car or connected car, health care, digital education, retail, security, and safety services) based on 5G communication technology and IoT technology.

In the following description, terms referring to broadcast information, terms referring to control information, terms related to communication coverage, terms referring to state changes (e.g., events), terms referring to network entities, terms referring to messages, terms referring to components of an apparatus, and the like are illustrated for convenience of description. Thus, the disclosure is not limited to the terms described below and other terms having equivalent technical meanings may be used.

In the following description, terms and names defined in the $3^{rd}$ generation partnership project long term evolution (3GPP LTE) standards may be used for convenience of description. However, the disclosure is not limited to such terms and names and may be similarly applied to systems according to other standards.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink and employs single carrier-frequency division multiple access (SC-FDMA) for an uplink. The uplink refers to a radio link for transmitting data or a control signal from a terminal (e.g., a user equipment (UE) or a mobile station (MS)) to a base station (e.g., an evolved Node B (eNB) or a base station (BS)), and the downlink refers to a radio link for transmitting data or a control signal from the base station to the terminal. The above-described multiple access schemes distinguish between data or control information of different users by allocating time-frequency resources for the data or control information of the users not to overlap each other, that is, to achieve orthogonality therebetween.

As post-LTE systems, 5G systems need to support services capable of reflecting and satisfying various requirements of users, service providers, and the like. Services considered for the 5G systems include enhanced mobile broadband (eMBB), massive machine-type communication (mMTC), and ultra-reliability low-latency communication (URLLC) services.

According to some embodiments, the eMBB aims to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Simultaneously, it is necessary to provide an increased user-perceived data rate of a terminal. In order to satisfy such requirements, there is a need for an improvement in transmission/reception technology including an improved multiple-input multiple-output (MIMO) transmission technology. Also, the data rate required in the 5G communication system may be satisfied by using a frequency bandwidth wider than 20 MHz in the 3 GHz to 6 GHz or 6 GHz or more frequency band instead of the 2 GHz band used by the current LTE.

Simultaneously, the mMTC is being considered to support application services such as Internet of Thing (IoT) in 5G communication systems. In order to efficiently provide the IoT, the mMTC may require the support for access of large terminals in a cell, improved terminal coverage, improved battery time, reduced terminal cost, and the like. Because the IoT is attached to various sensors and various devices to provide a communication function, it should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, it may require wider coverage than other services provided by the 5G communication systems. The terminal supporting the mMTC should be configured as a low-cost terminal and may require a very long battery life time because it is difficult to frequently replace the battery of the terminal.

Lastly, the URLLC should provide communications providing ultra-low latency and ultra reliability, as services for remote control of robots or machinery, industrial automation, unmanned aerial vehicles, remote health care, emergency alerts, and the like, as cellular-based wireless communication services used for mission-critical purposes. For example, a service supporting the URLLC should satisfy an air interface latency of less than 0.5 milliseconds and simultaneously has a requirement for a packet error rate of $10^{-5}$ or less. Thus, for the service supporting the URLLC, the 5G system should provide a smaller transmit time interval (TTI) than other services and simultaneously has a design requirement for allocating wide resources in a frequency band. However, the above-described mMTC, URLLC, and eMBB are merely examples of different service types, and the service types to which the disclosure is applied are not limited thereto.

The above-described services considered in the 5G communication systems should be provided in a converged manner with each other based on one framework. That is, for efficient resource management and control, respective services may be integrated, controlled, and transmitted as one system rather than operated independently.

Also, although embodiments of the disclosure will be described below by using an LTE, LTE-A, LTE Pro, or NR system as an example, the embodiments of the disclosure may also be applied to other communication systems having similar technical backgrounds or channel forms. Also, the embodiments of the disclosure may also be applied to other communication systems through some modifications without departing from the scope of the disclosure by the judgment of those of ordinary skill in the art.

The disclosure relates to a method and apparatus for reporting channel state information for increasing the power saving efficiency of a terminal in a wireless communication system.

According to the disclosure, when the terminal operates in a power saving mode in the wireless communication system, the power saving effect may be further improved by optimizing the channel state information reporting method accordingly.

Hereinafter, a frame structure of the 5G system will be described in more detail with reference to the drawings.

FIG. 1 is a diagram illustrating a basic structure of a time-frequency domain that is a radio resource region of a wireless communication system, according to an embodiment of the disclosure.

Referring to FIG. 1, the horizontal axis in FIG. 1 represents a time domain and the vertical axis represents a frequency domain. The basic unit of resources in the time and frequency domain may be a resource element (RE) 1-01 and may be defined by one orthogonal frequency division multiplexing (OFDM) symbol 1-02 on the time axis and one subcarrier 1-03 on the frequency axis. In the frequency domain, $N_{SC}^{RB}$ (e.g., 12) consecutive REs may constitute one resource block (RB) 1-04. In an embodiment of the disclosure, a plurality of OFDM symbols may constitute one subframe 1-10.

Figure 2:
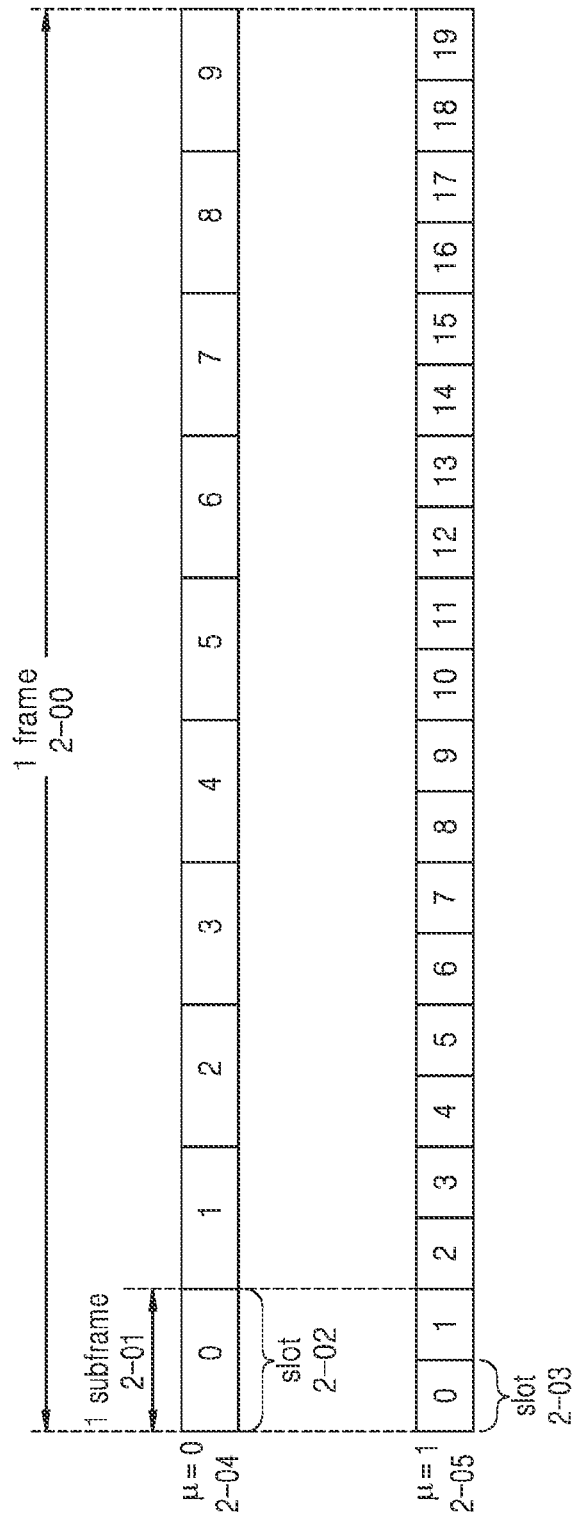
FIG. 2 is a diagram for describing a frame, subframe, and slot structure of a wireless communication system according to an embodiment of the disclosure.

FIG. 2 is a diagram for describing a frame, subframe, and slot structure of a wireless communication system according to an embodiment of the disclosure.

Referring to FIG. 2, one frame 2-00 may include one or more subframes 2-01, and one subframe may include one or more slots 2-02. For example, one frame 2-00 may be defined as 10 ms. One subframe 2-01 may be defined as 1 ms, and in this case, one frame 2-00 may include a total of 10 subframes 2-01. One slot 2-02 or 2-03 may be defined as 14 OFDM symbols (i.e., the number of symbols per slot ($N_{symb}^{slot}$)=14). One subframe 2-01 may include one or more slots 2-02 or 2-03, and the number of slots 2-02 or 2-03 per subframe 2-01 may vary according to configuration values μ (2-04 and 2-05) for subcarrier spacing.

In the example of FIG. 2, a case where subcarrier spacing values are configured to μ=0 (2-04) and μ=1 (2-05) is illustrated. In the case of μ=0 (2-04), one subframe 2-01 may include one slot 2-02, and in the case of μ=1 (2-05), one subframe 2-01 may include two slots 2-03. That is, the number of slots per subframe ($N_{slot}^{subframe,\mu}$) may vary according to the configuration values μ for the subcarrier spacing, and accordingly, the number of slots per frame ($N_{slot}^{frame,\mu}$) may vary. $N_{slot}^{subframe,\mu}$ and $N_{slot}^{frame,\mu}$ according to the subcarrier spacing values μ may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 1-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |
| 5 | 14 | 320 | 32 |

In the NR, one component carrier (CC) or serving cell may include up to 250 or more RBs. Thus, when a terminal always receives the entire serving cell bandwidth as in LTE, the power consumption of the terminal may be extreme, and in order to solve this limitation, a base station may configure one or more bandwidth parts (BWPs) for the terminal to support the terminal to change a reception region in the cell. In the NR, the base station may configure 'initial BWP', which is a bandwidth of CORESET #0 (or common search space (CSS)), for the terminal through a master information block (MIB). Thereafter, the base station may configure an initial BWP (first BWP) of the terminal through radio resource control (RRC) signaling and notify at least one piece of BWP configuration information that may be indicated through downlink control information (DCI) at a later time. Thereafter, the base station may notify a BWP ID through the DCI to indicate which band will be used by the terminal. When the terminal fails to receive the DCI in the currently allocated BWP for a certain time or more, the terminal may return to 'default BWP' and attempt to receive the DCI.

Figure 3:
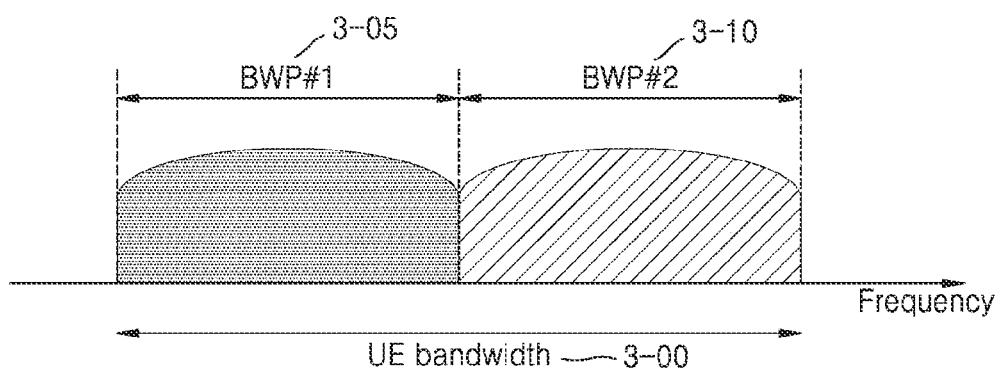
FIG. 3 is a diagram for describing an example of a configuration of a bandwidth part in a wireless communication system according to an embodiment of the disclosure.

FIG. 3 is a diagram for describing an example of a configuration of a bandwidth part in a wireless communication system according to an embodiment of the disclosure.

Referring to FIG. 3, a terminal (UE) bandwidth 3-00 may include two bandwidth parts, that is, a bandwidth part #1 3-05 and a bandwidth part #2 3-10. The base station may configure one or more bandwidth parts for the terminal and may configure information as in Table 2 below for each bandwidth part.

TABLE 2

```
BWP ::=            SEQUENCE {
    bwp-Id             BWP-Id,
    locationAndBandwidth    INTEGER (1..65536),
    subcarrierSpacing       ENUMERATED {n0, n1, n2, n3, n4, n5},
    cyclicPrefix            ENUMERATED { extended }
}
```

However, the disclosure is not limited to the above example, and in addition to the above configuration information, various parameters related to the bandwidth part may be configured for the terminal. The above information may be transmitted from the base station to the terminal through higher layer signaling, for example, RRC signaling. At least one bandwidth part among the configured one or more bandwidth parts may be activated. Information about the activation/deactivation of the configured bandwidth part may be semi-statically transmitted from the base station to the terminal through RRC signaling or may be dynamically transmitted through a medium access control (MAC) control element (CE) or DCI.

According to an embodiment of the disclosure, the terminal before RRC connection may be configured with an initial bandwidth part (initial BWP) for initial connection from the base station through the MIB. More particularly, in order to receive system information (remaining system information (RMSI) or system information block 1 that may correspond to SIB1) necessary for initial access through the MIB in the initial access operation, the terminal may receive configuration information for a control resource set (CORESET) and a search space in which a physical downlink control channel (PDCCH) may be transmitted. Each of the control resource set and the search space configured by the MIB may be regarded as an identifier (ID) 0.

The base station may notify the terminal of configuration information such as frequency allocation information, time allocation information, and numerology for the control resource set #0 through the MIB. Also, the base station may notify the terminal of configuration information about a monitoring period and occasion for control resource set #0, that is, configuration information about the search space #0, through the MIB. The terminal may regard the frequency domain configured as the control resource set #0 obtained from the MIB, as an initial bandwidth part for initial access. In this case, the identifier (ID) of the initial bandwidth part may be regarded as 0.

A configuration for the bandwidth part supported by the wireless communication system (5G or NR system) described above may be used for various purposes.

For example, when the bandwidth supported by the terminal is smaller than the system bandwidth, the bandwidth supported by the terminal may be supported through the configuration for the bandwidth part. For example, the frequency position of the bandwidth part (configuration information 2) may be configured for the terminal in Table 2, and thus, the terminal may transmit/receive data at a particular frequency position in the system bandwidth.

As another example, for the purpose of supporting different numerologies, the base station may configure a plurality of bandwidth parts for the terminal. For example, in order to support data transmission/reception using a subcarrier spacing of 15 kHz and a subcarrier spacing of 30 kHz to a certain terminal, two bandwidth parts may be configured to use subcarrier spacings of 15 kHz and 30 kHz, respectively. Different bandwidth parts may be frequency-division-multiplexed (FDMed), and when data is to be transmitted/received at particular subcarrier spacings, the bandwidth part configured at the particular subcarrier spacings may be activated.

As another example, for the purpose of reducing power consumption of the terminal, the base station may configure bandwidth parts having bandwidths of different sizes for the terminal. For example, when the terminal supports a very large bandwidth, for example, a bandwidth of 100 MHz, and always transmits/receives data with the bandwidth, it may cause very large power consumption. Particularly, it may be very inefficient in terms of power consumption of the terminal to monitor an unnecessary downlink control channel for a large bandwidth of 100 MHz while there is no traffic. Therefore, in order to reduce power consumption of the terminal, the base station may configure a bandwidth part of a relatively small bandwidth, for example, a bandwidth part of 20 MHz, for the terminal. The terminal may perform a monitoring operation in a 20 MHz bandwidth part in a situation where there is no traffic, and may transmit/receive data by using a 100 MHz bandwidth part according to the indication of the base station when data is generated.

In the method of configuring the bandwidth part described above, terminals before RRC connection (connected) may receive configuration information about the initial bandwidth part through the MIB in the initial connection operation. More particularly, the terminal may be configured with a control region (control resource set (CORESET)) for a downlink control channel through which DCI for scheduling a system information block (SIB) may be transmitted, from the MIB of a physical broadcast channel (PBCH). The bandwidth of the control resource set configured by the MIB may be regarded as an initial bandwidth part, and the terminal may receive a physical downlink shared channel (PDSCH) in which the SIB is transmitted through the configured initial bandwidth part. In addition to the purpose of receiving the SIB, the initial bandwidth part may be utilized for other system information (OSI), paging, and random access.

Hereinafter, a synchronization signal (SS)/PBCH block of a wireless communication system (5G or NR system) according to an embodiment of the disclosure will be described.

The SS/PBCH block may refer to a physical layer channel block including a primary SS (PSS), a secondary SS (SSS), and a PBCH. More particularly, the SS/PBCH block may be defined as follows.

PSS: some information of a cell ID may be provided as a reference signal for downlink time/frequency synchronization.

SSS: the other cell ID information that is a reference for downlink time/frequency synchronization and is not provided by the PSS may be provided. Additionally, it may function as a reference signal for demodulation of the PBCH.

PBCH: essential system information necessary for transmitting/receiving a data channel and a control channel of the terminal may be provided. The essential system information may include search space-related control information representing radio resource mapping information of a control channel, scheduling control information about a separate data channel for transmitting system information, or the like.

SS/PBCH block: the SS/PBCH block may include a combination of the PSS, the SSS, and the PBCH. One SS/PBCH block or a plurality of SS/PBCH blocks may be transmitted within 5 ms, and each transmitted SS/PBCH block may be distinguished by an index.

The terminal may detect the PSS and the SSS in the initial access operation and may decode the PBCH. The terminal may obtain the MIB from the PBCH and may be configured with the control resource set #0 through the MIB. The terminal may perform monitoring on the control resource set #0, assuming that a selected SS/PBCH block and a demodulation reference signal (DMRS) transmitted in the control resource set #0 are subjected to Quasi Co Location (QCL). The terminal may receive system information through downlink control information transmitted in the control resource set #0. The terminal may obtain configuration information related to a random access channel (RACH) necessary for initial access from the received system information. The terminal may transmit a physical RACH (PRACH) to the base station by considering the selected SS/PBCH index, and the base station having received the PRACH may obtain information about the SS/PBCH block index selected by the terminal. The base station may know that the terminal has selected a certain block among the SS/PBCH blocks and the terminal monitors the control resource set #0 corresponding to (or associated with) the selected SS/PBCH block.

Hereinafter, downlink control information (hereinafter referred to as DCI) in a next-generation wireless communication system (e.g., 5G or NR system) will be described in more detail.

In the next-generation wireless communication system (e.g., 5G or NR system), scheduling information about uplink data (or physical uplink shared channel (PUSCH)) or downlink data (or physical downlink shared channel (PDSCH)) may be transmitted from the base station to the terminal through the DCI. The terminal may monitor a fallback DCI format and a non-fallback DCI format with respect to the PUSCH or PDSCH. The fallback DCI format may include a fixed field predefined between the base station and the terminal, and the non-fallback DCI format may include a configurable field.

The DCI may be transmitted through a physical downlink control channel (PDCCH) through a channel coding and modulation process. A cyclic redundancy check (CRC) may be attached to a DCI message payload, and the CRC may be scrambled by a radio network temporary identifier (RNTI) corresponding to the identity of the terminal. Different RNTIs may be used to scramble the CRC attached to the payload of the DCI message according to the purpose of the DCI message, for example, terminal-specific (UE-specific) data transmission, a power control command, or a random access response. That is, the RNTI may not be explicitly transmitted but may be included in a CRC calculation process and transmitted. When the DCI message transmitted on the PDCCH is received, the terminal may identify the CRC by using the allocated RNTI. When the CRC identification result is correct, the terminal may know that the corresponding message has been transmitted to the terminal.

For example, the DCI for scheduling the PDSCH about system information (SI) may be scrambled by an SI-RNTI. The DCI for scheduling the PDSCH about a random access response (RAR) message may be scrambled by an RA-RNTI. The DCI for scheduling the PDSCH about a paging message may be scrambled by a P-RNTI. The DCI for notifying a slot format indicator (SFI) may be scrambled by an SFI-RNTI. The DCI for notifying a transmit power control (TPC) may be scrambled by a TPC-RNTI. The DCI for scheduling a UE-specific PDSCH or PUSCH may be scrambled by a cell RNTI (C-RNTI).

A DCI format 00 may be used as fallback DCI for scheduling the PUSCH, and in this case, the CRC may be scrambled by a C-RNTI. In an embodiment of the disclosure, the DCI format 0_0 in which the CRC is scrambled by the C-RNTI may include pieces of information such as those in Table 3 below.

TABLE 3

Identifier for DCI formats—[1] bit
Frequency domain resource assignment—$[\lceil \log_2(N_{RB}^{UL,BWP}(N_{RB}^{UL,BWP} + 1)/2)\rceil]$ bits
Time domain resource assignment—X bits
Frequency hopping flag—1 bit.
Modulation and coding scheme—5 bits
New data indicator—1 bit
Redundancy version—2 bits
HARQ process number bits—4 bits
TPC command for scheduled PUSCH (Transmit power control command for scheduled PUSCH—[2] bits
UL/SUL indicator—0 or 1 bit A DCI format 0_1 may be used as non-fallback DCI for scheduling the PUSCH, and in this case, the CRC may be scrambled by a C-RNTI. In an embodiment of the disclosure, the DCI format 0_1 in which the CRC is scrambled by the C-RNTI may include pieces of information such as those in Table 4 below.

TABLE 4

Carrier indicator-0 or 3 bits
UL/SUL indicator-0 or 1 bit
Identifier for DCI formats-[1] bits
Bandwidth part indicator-0, 1 or 2 bits
Frequency domain resource assignment
    For resource allocation type 0, $\lceil N_{RB}^{UL,BWP}/P \rceil$ bits
    For resource allocation type 1, $\lceil \log_2 (N_{RB}^{UL,BWP} (N_{RB}^{UL,BWP} + 1)/2) \rceil$ bits
Time domain resource assignment-1, 2, 3, or 4 bits
VRB-to-PRB mapping-0 or 1 bit, only for resource allocation type 1.
    0 bit if only resource allocation type 0 is configured;
    1 bit otherwise.
Frequency hopping flag-0 or 1 bit, only for resource allocation type 1.
    0 bit if only resource allocation type 0 is configured;
    1 bit otherwise.
Modulation and coding scheme-5 bits
New data indicator-1 bit
Redundancy version-2 bits
HARQ process number-4 bits
1st downlink assignment index-1 or 2 bits
    1 bit for semi-static HARQ-ACK codebook;
    2 bits for dynamic HARQ-ACK codebook with single HARQ-ACK codebook.
2nd downlink assignment index-0 or 2 bits
    2 bits for dynamic HARQ-ACK codebook with two HARQ-ACK sub-codebooks;
    0 bit otherwise.
TPC command for scheduled PUSCH-2 bit SRS resource indicator – $\left\lceil \log_2 \left( \sum_{k=1}^{L_{max}} \binom{N_{SRS}}{k} \right) \right\rceil$ or $\lceil \log_2 (N_{SRS}) \rceil$ bits bits $\left\lceil \log_2 \left( \sum_{k=1}^{L_{max}} \binom{N_{SRS}}{k} \right) \right\rceil$ bits for non-codebook based PUSCH transmission;

$\lceil \log_2 (N_{SRS}) \rceil$ bits for codebook based PUSCH transmission.
Precoding information and number of layers-up to 6 bits
Antenna ports-up to 5 bits
SRS request-2 bits
CSI request-0, 1, 2, 3, 4, 5, or 6 bits
CBG transmission information-0, 2, 4, 6, or 8 bits
PTRS-DMRS association-0 or 2 bits.
beta_offset indicator-0 or 2 bits
DMRS sequence initialization-0 or 1 bit A DCI format 10 may be used as fallback DCI for scheduling the PDSCH, and in this case, the CRC may be scrambled by a C-RNTI. In an embodiment of the disclosure, the DCI format 1_0 in which the CRC is scrambled by the C-RNTI may include pieces of information such as those in Table 5 below.

TABLE 5

Identifier for DCI formats—[1] bit
Frequency domain resource assignment—$\lceil \lceil \log_2(N_{RB}^{DL,BWP}(N_{RB}^{DL,BWP} + 1)/2) \rceil \rceil$ bits
Time domain resource assignment—X bits
VRB-to-PRB mapping—1 bit.
Modulation and coding scheme—5 bits
New data indicator—1 bit
Redundancy version—2 bits
HARQ process number—4 bits
Downlink assignment index—2 bits
TPC command for scheduled PUCCH—[2] bits
PUCCH resource indicator 3 bits
PDSCH-to-HARQ feedback timing indicator—[3] bits A DCI format 1_1 may be used as non-fallback DCI for scheduling the PDSCH, and in this case, the CRC may be scrambled by a C-RNTI. In an embodiment of the disclosure, the DCI format 1_1 in which the CRC is scrambled by the C-RNTI may include pieces of information such as those in Table 6 below.

TABLE 6

Figure 4:
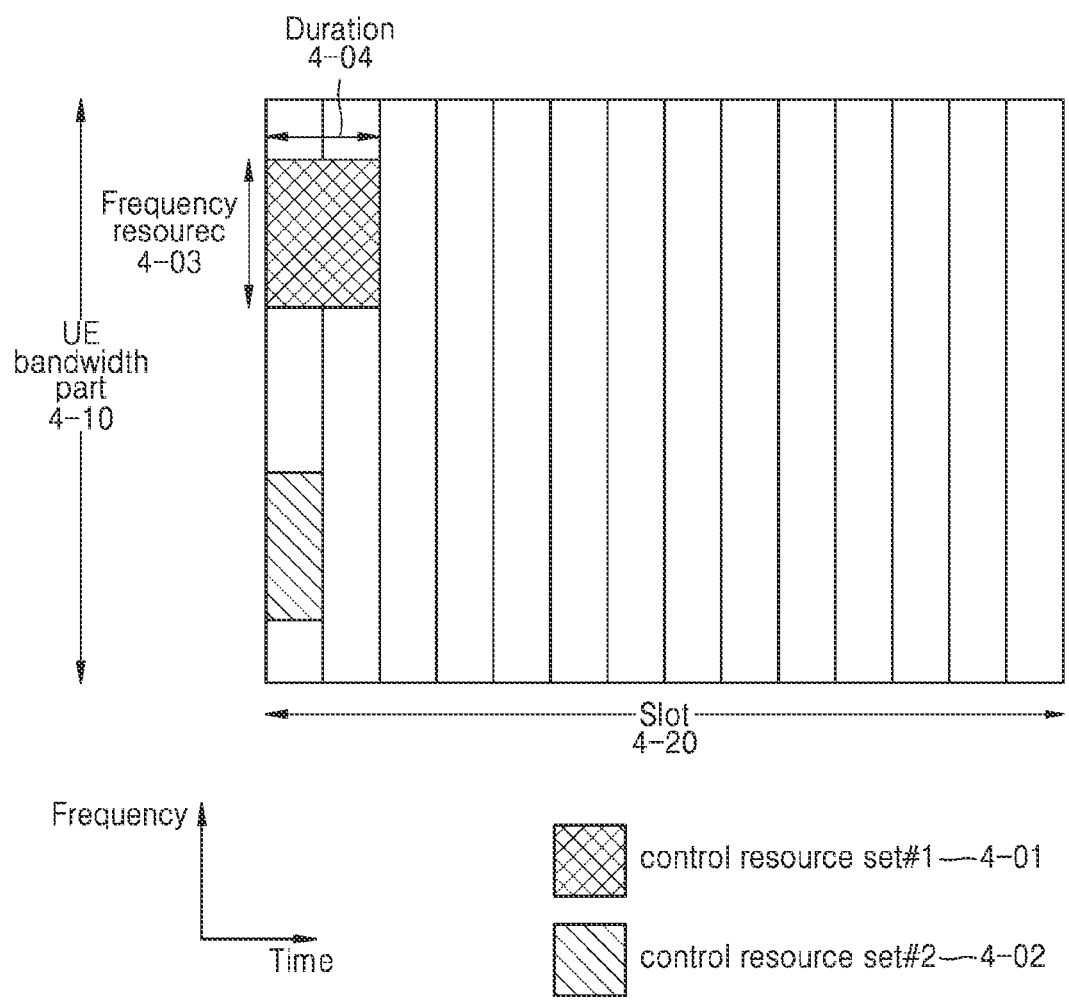
FIG. 4 is a diagram for describing a control region (control resource set) configuration of a downlink control channel of a next-generation wireless communication system according to an embodiment of the disclosure.

Carrier indicator—0 or 3 bits
Identifier for DCI formats—[1] bits
Bandwidth part indicator—0, 1 or 2 bits
Frequency domain resource assignment
    For resource allocation type 0, $\lceil N_{RB}^{DL,BWP}/P \rceil$ bits
    For resource allocation type 1, $\lceil \log_2(N_{RB}^{DL,BWP}(N_{RB}^{DL,BWP} + 1)/2) \rceil$ bits
Time domain resource assignment—1, 2, 3, or 4 bits
VRB-to-PRB mapping—0 or 1 bit, only for resource allocation type 1.
    0 bit if only resource allocation type 0 is configured;
    1 bit otherwise.
PRB bundling size indicator—0 or 1 bit
Rate matching indicator—0, 1, or 2 bits
ZP CSI-RS trigger—0, 1, or 2 bits
For transport block 1:
    Modulation and coding scheme—5 bits
    New data indicator—1 bit
    Redundancy version—2 bits
For transport block 2:
    Modulation and coding scheme—5 bits
    New data indicator—1 bit
    Redundancy version—2 bits
HARQ process number—4 bits
Downlink assignment index—0 or 2 or 4 bits
TPC command for scheduled PUCCH—2 bits
PUCCH resource indicator—3 bits
PDSCH-to-HARQ_feedback timing indicator—3 bits
Antenna ports—4, 5 or 6 bits
Transmission configuration indication—0 or 3 bits
SRS request—2 bits
CBG transmission information—0, 2, 4, 6, or 8 bits
CBG flushing out information—0 or 1 bit
DMRS sequence initialization—1 bit FIG. 4 is a diagram for describing a control resource set (CORESET) configuration of a downlink control channel of a next-generation wireless communication system according to an embodiment of the disclosure. Referring to FIG. 4, it may be seen that two control regions (control resource set #1 4-01 and control resource set #2 4-02) are configured in a terminal bandwidth part (UE bandwidth part) 4-10 on the frequency axis and one slot 4-20 on the time axis. The control resource sets 4-01 and 4-02 may be configured to a particular frequency resource 4-03 in the entire terminal bandwidth part 4-10 on the frequency axis. The control resource sets 4-01 and 4-02 may be configured by one or more OFDM symbols on the time axis and may be defined by a control resource set duration 4-04. Referring to FIG. 4, the control resource set #1 4-01 may be configured by a control resource set length of two symbols, and the control resource set #2 4-02 may be configured by a control resource set length of one symbol.

The control resource set in the next-generation wireless communication system (5G or NR system) described above may be configured by the base station for the terminal through higher layer signaling (e.g., system information, master information block (MIB), or radio resource control (RRC) signaling). Configuring the control resource set for the terminal may mean providing information such as a control resource set identifier, a frequency position of the control resource set, or a symbol length of the control resource set. For example, the configuration of the control resource set may include pieces of information such as those in Table 7 below.

TABLE 7

```
ControlResourceSet ::=         SEQUENCE {
-- Corresponds to L1 parameter 'CORESET-ID'
controlResourceSetId           ControlResourceSetId,
frequencyDomainResources       BIT STRING (SIZE (45)),
duration                       INTEGER (1..maxCoReSetDuration),
cce-REG-MappingType            CHOICE {
    interleaved                SEQUENCE {
        reg-BundleSize         ENUMERATED {n2, n3, n6},
        precoderGranularity    ENUMERATED {sameAsREG-
bundle, allContiguousRBs},
        interleaverSize        ENUMERATED {n2, n3, n6}
        shiftIndex
            INTEGER(0..maxNrofPhysicalResourceBlocks-1)
            OPTIONAL
    },
    nonInterleaved             NULL
},
tci-StatesPDCCH                SEQUENCE(SIZE (1..maxNrofTCI-
    StatesPDCCH)) OF TCI-StateId           OPTIONAL,
tci-PresentInDCI               ENUMERATED {enabled}
                               OPTIONAL,     -- Need S
}
```

In Table 7, tci-StatesPDCCH (hereinafter referred to as "TCI state") configuration information may include information of a channel state information reference signal (CSI-RS) index or one or more synchronization signal(SS)/physical broadcast channel (PBCH) block indexes having a quasi co-located (QCL) relationship with a demodulation reference signal (DMRS) transmitted in the corresponding control resource set.

Figure 5:
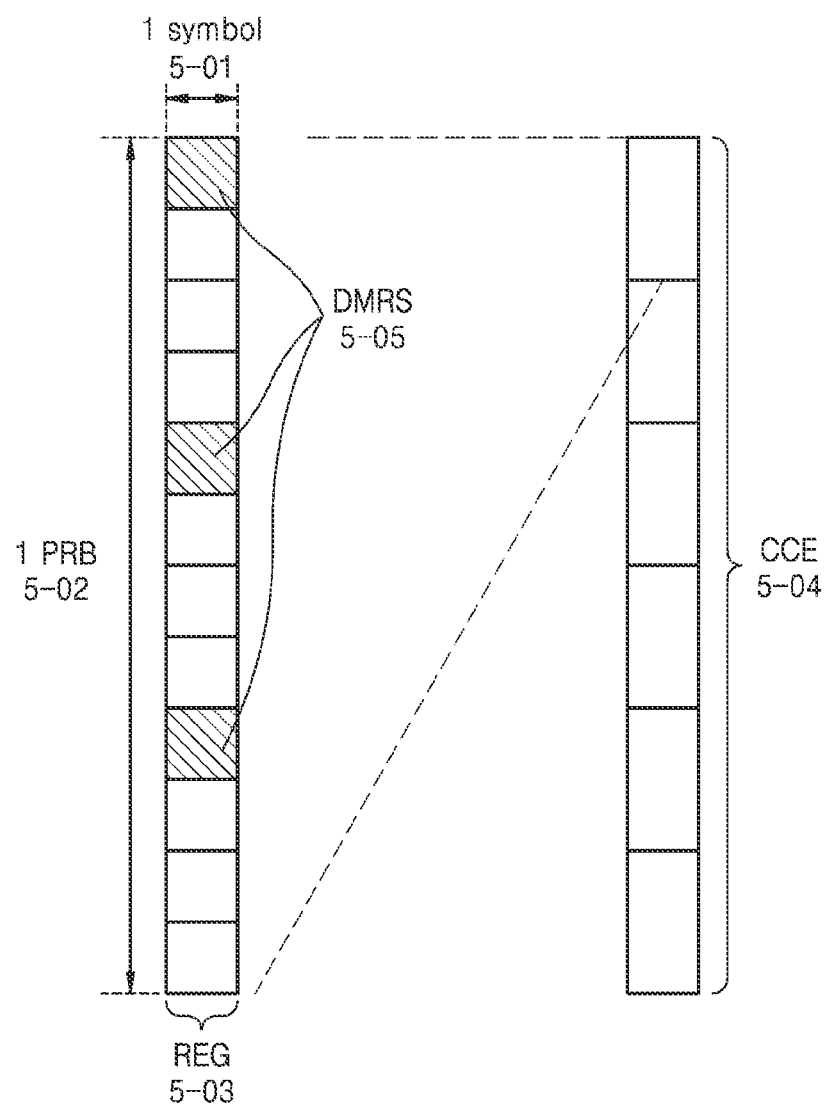
FIG. 5 is a diagram for describing a structure of a downlink control channel of a next-generation wireless communication system according to an embodiment of the disclosure.

FIG. 5 is a diagram for describing a structure of a downlink control channel of a next-generation wireless communication system according to an embodiment of the disclosure.

FIG. 5 illustrates an example of a basic unit of time and frequency resources constituting a downlink control channel that may be used in 5G according to an embodiment of the disclosure.

Referring to FIG. 5, a basic unit of time and frequency resources constituting a control channel may be defined as a resource element group (REG) 5-03. The REG 5-03 may be defined as 1 OFDM symbol 5-01 on the time axis and 1 physical resource block (PRB) 5-02 on the frequency axis, that is, 12 subcarriers. The base station may configure a downlink control channel allocation unit by concatenating REGs 5-03.

As illustrated in FIG. 5, when a basic unit in which a downlink control channel is allocated in 5G is referred to as a control channel element (CCE) 5-04, one CCE 5-04 may include a plurality of REGs 5-03. For example, the REG 5-03 illustrated in FIG. 5 may include 12 REs, and when one CCE 5-04 includes 6 REGs 5-03, one CCE 5-04 may include 72 REs. When a downlink control resource set is configured, the corresponding region may include a plurality of CCEs 5-04 and a particular downlink control channel may be mapped to one or more CCEs 5-04 according to an aggregation level (AL) in the control resource set and transmitted. The CCEs 5-04 in the control resource set may be divided by numbers, and in this case, the numbers of the CCEs 5-04 may be assigned according to a logical mapping method.

The basic unit of the downlink control channel illustrated in FIG. 5, that is, the REG 5-03, may include both REs to which DCI is mapped and a region to which a DMRS 5-05 as a reference signal for decoding this is mapped. As illustrated in FIG. 5, three DMRSs 5-05 may be transmitted in one REG 5-03. The number of CCEs required to transmit the PDCCH may be 1, 2, 4, 8, or 16 according to an aggregation level (AL), and the number of different CCEs may be used to implement the link adaptation of the downlink control channel. For example, when AL=L, one downlink control channel may be transmitted through L CCEs.

The terminal may have to detect a signal without knowing information about the downlink control channel, and a search space representing a set of CCEs may be defined for blind decoding. The search space may be a set of downlink control channel candidates including CCEs that the UE should attempt to decode on a given aggregation level. Because there are various aggregation levels that make one bundle with 1, 2, 4, 8, or 16 CCEs, the terminal may have a plurality of search spaces. A search space set may be defined as a set of search spaces in all aggregation levels.

The search space may be classified into a common search space and a terminal-specific (UE-specific) search space. According to an embodiment of the disclosure, a certain group of terminals or all terminals may monitor the common search space of the PDCCH to receive cell-common control information such as a paging message or dynamic scheduling about system information.

For example, the terminal may receive PDSCH scheduling allocation information for transmission of the SIB including operator information of the cell by monitoring the common search space of the PDCCH. In the case of the common search space, because a certain group of terminals or all terminals may have to receive the PDCCH, the common search space may be defined as a set of predefined CCEs. Moreover, the terminal may receive scheduling allocation information about the UE-specific PDSCH or PUSCH by monitoring the UE-specific search space of the PDCCH. The UE-specific search space may be UE-specifically defined by the identity of the terminal and a function of various system parameters.

In the 5G, parameters about the search space for the PDCCH may be configured by the base station for the terminal through higher layer signaling (e.g., SIB, MIB, or RRC signaling). For example, the base station may configure, for the terminal, the number of PDCCH candidates in each aggregation level L, the monitoring period for the search space, the monitoring occasion in symbol units in the slot for the search space, the search space type (common search space or UE-specific search space), a combination of a DCI format and an RNTI to be monitored in the corresponding search space, a control resource set index to be monitored in the search space, or the like. For example, the above configuration may include pieces of information such as those in Table 8 below.

TABLE 8

```
SearchSpace ::=                   SEQUENCE {
-- Identity of the search space. SearchSpaceId = 0 identifies the SearchSpace
    configured via PBCH (MIB) or ServingCellConfigCommon.
searchSpaceId                     SearchSpaceId,
controlResourceSetId              ControlResourceSetId,
monitoringSlotPeriodicityAndOffset CHOICE {
    sl1                           NULL,
    sl2                           INTEGER (0..1),
```

TABLE 8-continued

```
        sl4                     INTEGER (0..3),
        sl5                     INTEGER (0..4),
        sl8                     INTEGER (0..7),
        sl10                    INTEGER (0..9),
        sl16                    INTEGER (0..15),
        sl20                    INTEGER (0..19)
}
                OPTIONAL,
    duration                INTEGER (2..2559)
    monitoringSymbolsWithinSlot         BIT STRING (SIZE (14))
                                        OPTIONAL,
    nrofCandidates                      SEQUENCE {
        aggregationLevel1               ENUMERATED {n0, n1, n2, n3, n4,
    n5, n6, n8},
        aggregationLevel2               ENUMERATED {n0, n1, n2, n3, n4,
    n5, n6, n8},
        aggregationLevel4               ENUMERATED {n0, n1, n2, n3, n4,
    n5, n6, n8},
        aggregationLevel8               ENUMERATED {n0, n1, n2, n3, n4,
    n5, n6, n8},
        aggregationLevel16              ENUMERATED {n0, n1, n2, n3, n4,
    n5, n6, n8},
    },
    searchSpaceType                     CHOICE {
    -- Configures this search space as common search space (CSS) and DCI
    formats to monitor.
        common                          SEQUENCE {
        }
        ue-Specific                     SEQUENCE {
        -- Indicates whether the UE monitors in this USS for DCI formats 0-0 and
    1-0 or for formats 0-1 and 1-1.
            formats                     ENUMERATED {formats0-0-
    And-1-0, formats0-1-And-1-1},
            ...
        }
```

Based on the configuration information, the base station may configure one or more search space sets for the terminal. According to an embodiment of the disclosure, the base station may configure a search space set 1 and a search space set 2 for the terminal, may be configured to be monitor a DCI format A, which is scrambled by an X-RNTI in the search space set 1, in the common search space, and may be configured to be monitor a DCI format B, which is scrambled by a Y-RNTI in the search space set 2, in the UE-specific search space.

According to the configuration information, one or more search space sets may be in the common search space or the UE-specific search space. For example, a search space set #1 and a search space set #2 may be configured as the common search space, and a search space set #3 and a search space set #4 may be configured as the UE-specific search space.

In the common search space, the following combinations of DCI formats and RNTIs may be monitored. However, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI
    DCI format 2_0 with CRC scrambled by SFI-RNTI
    DCI format 2_1 with CRC scrambled by INT-RNTI
    DCI format 2_2 with CRC scrambled by TPC-PUSCH-RNTI, TPC-PUCCH-RNTI
    DCI format 2_3 with CRC scrambled by TPC-SRS-RNTI In the UE-specific search space, the following combinations of DCI formats and RNTIs may be monitored. However, the disclosure is not limited to the following examples.

DCI format 0_0/1_0 with CRC scrambled by C-RNTI, CS-RNTI, TC-RNTI
    DCI format 1_0/1_1 with CRC scrambled by C-RNTI, CS-RNTI, TC-RNTI The specified RNTIs may follow the following definitions and purposes.

C-RNTI (Cell RNTI): for the purpose of UE-specific PDSCH scheduling

TC-RNTI (Temporary Cell RNTI): for the purpose of UE-specific PDSCH scheduling

CS-RNTI (Configured Scheduling RNTI): for the purpose of semi-statically configured UE-specific PDSCH scheduling RA-RNTI (Random Access RNTI): for the purpose of PDSCH scheduling in random access operation P-RNTI (Paging RNTI): for the purpose of PDSCH scheduling for transmitting paging SI-RNTI (System Information RNTI): for the purpose of PDSCH scheduling for transmitting system information INT-RNTI (Interruption RNTI): for the purpose of indicating whether to perform puncturing on the PDSCH TPC-PUSCH-RNTI (Transmit Power Control for PUSCH RNTI): for the purpose of indicating power control command about PUSCH TPC-PUCCH-RNTI (Transmit Power Control for PUCCH RNTI): for the purpose of indicating power control command about PUCCH TPC-SRS-RNTI (Transmit Power Control for SRS RNTI): for the purpose of indicating power control command about SRS In an embodiment of the disclosure, the above DCI formats may be defined as in Table 9 below.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in the 5G, a plurality of search space sets may be configured with different parameters (e.g., parameters of Table 8). Thus, the set of search space sets monitored by the terminal at every time may vary. For example, when the search space set #1 is configured at an X-slot period, the search space set #2 is configured at a Y-slot period, and X and Y are different from each other, the terminal may monitor both the search space set #1 and the second space set #2 in a particular slot and may monitor one of the search space set #1 and the search space set #2 in a particular slot.

When a plurality of search space sets are configured for the terminal, the following conditions may be considered in order to determine the search space set to be monitored by the terminal.

[Condition 1: Limitation on the Maximum Number of PDCCH Candidates]

The number of PDCCH candidates that may be monitored per slot may not exceed $M\mu$. $M\mu$ may be defined as the maximum number of PDCCH candidates per slot in the cell configured with a subcarrier spacing of $15 \cdot 2^\mu$ kHz and may be defined as in Table 10 below.

TABLE 10

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limitation on the Maximum Number of CCEs]

The number of CCEs constituting the entire search space per slot (where the entire search space may refer to the entire CCE set corresponding to a union region of a plurality of search space sets) may not exceed $C\mu$. $C\mu$ may be defined as the maximum number of CCEs per slot in the cell configured with a subcarrier spacing of $15 \cdot 2^\mu$ kHz and may be defined as in Table 11 below.

TABLE 11

| μ | Maximum number of CCEs per slot and per serving cell ($C^\mu$) |
|---|---|
| 0 | 56 |
| 1 | 56 |
| 2 | 48 |
| 3 | 32 |

For convenience of description, a situation in which both the conditions 1 and 2 are satisfied at a particular time may be defined as "condition A" for example. Thus, not satisfying the condition A may mean not satisfying at least one of the conditions 1 and 2 described above.

According to the configuration of the search space sets of the base station, the condition A may not be satisfied at a particular time. When the condition A is not satisfied at a particular time, the terminal may select and monitor only some of the search space sets configured to satisfy the condition A at the corresponding time and the base station may transmit the PDCCH in the selected search space set.

According to an embodiment of the disclosure, the following method may be followed as a method of selecting some search spaces among all the configured search space set.

[Method 1]

When the condition A for the PDCCH is not satisfied at a particular time (slot), the terminal (or the base station) may preferentially select a search space set configured as the common search space as the search space type over a search space set configured as the UE-specific search space, among the search space sets existing at the corresponding time.

When all the search space sets configured as the common search space are selected (that is, the condition A is satisfied even after selecting all the search spaces set configured as the common search space), the terminal (or the base station) may select search space sets configured as the UE-specific search space. In this case, when there are a plurality of search space sets configured as the UE-specific search space, the terminal or the base station may select UE-specific search space sets within the range where the condition A is satisfied, by considering the priority. For example, a search space set having a lower search space set index may have a higher priority.

Methods of allocating time and frequency resources for data transmission in the NR will be described below.

In the NR, in addition to the frequency domain resource candidate allocation through the BWP indication, the following detailed frequency domain resource allocation (FD-RA) methods may be provided.

Figure 6:
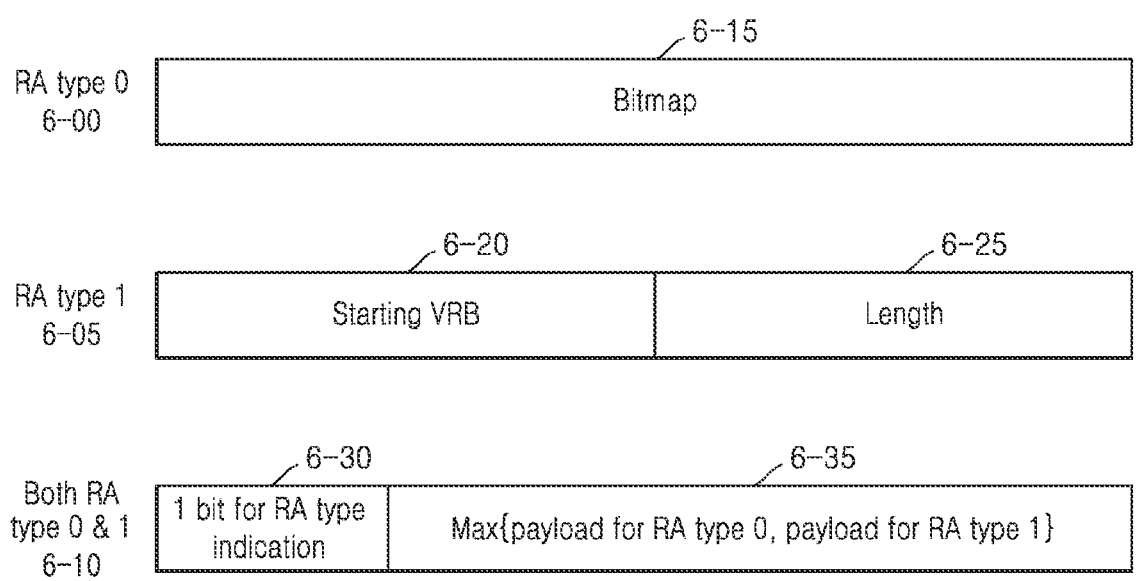
FIG. 6 is a diagram illustrating an example of frequency domain (axis) resource allocation of a PDSCH in a wireless communication system according to an embodiment of the disclosure.

FIG. 6 is a diagram illustrating an example of frequency domain (axis) resource allocation of a PDSCH in a wireless communication system according to an embodiment of the disclosure.

FIG. 6 illustrates three frequency domain resource allocation methods, that is, type 0 (6-00), type 1 (6-05), and dynamic switch (6-10) configurable through the upper layer in the NR.

Referring to FIG. 6, when a terminal is configured to use only a resource type 0 through higher layer signaling (6-00), some DCI for allocating the PDSCH to the terminal may have a bitmap including NRBG bits. The conditions for this will be described again below. In this case, NRBG may refer to the number of resource block groups (RBGs) determined as in Table 12 below according to an upper layer parameter RBG-size and a BWP size allocated by a BWP indicator, and data may be transmitted in the RBG represented as "1" by the bitmap.

TABLE 12

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When a terminal is configured to use only a resource type 1 through higher layer signaling (6-05), some DCI for allocating the PDSCH to the terminal may have frequency domain resource allocation information including $\lceil \log_2 (N_{RB}^{DL,BWP}(N_{RB}^{DL,BWP}+1)/2) \rceil$ bits. The conditions for this will be described again below. The base station may configure a starting VRB 6-20 and a length 6-25 of a frequency domain resource consecutively allocated therefrom.

When a terminal is configured to use both the resource type 0 and the resource type 1 through higher layer signaling (6-10), some DCI for allocating the PDSCH to the terminal may have frequency domain resource allocation information including bits of a great value 6-35 among a payload 6-15 for configuring the resource type 0 and payloads 6-20 and 6-25 for configuring the resource type 1. The conditions for this will be described again below. In this case, one bit may be added to the foremost part (MSB) of the frequency domain resource allocation information in the DCI, and when the bit is "0", the resource type 0 may be indicated to be used, and when the bit is "1", the resource type 1 may be indicated to be used.

Figure 7:
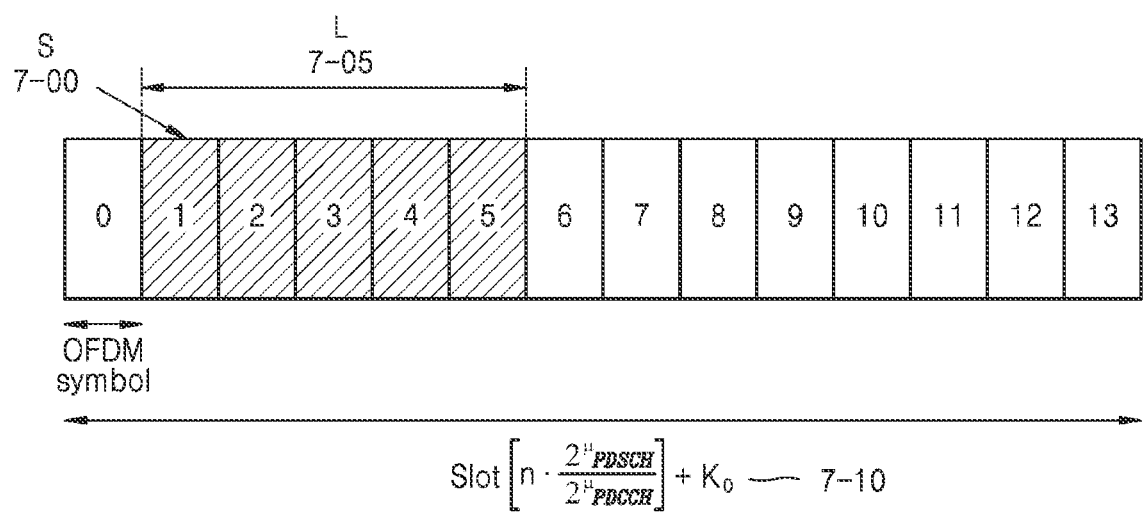
FIG. 7 is a diagram illustrating an example of time domain (axis) resource allocation of a PDSCH in a wireless communication system according to an embodiment of the disclosure.

FIG. 7 is a diagram illustrating an example of time domain (axis) resource allocation of a PDSCH in a wireless communication system according to an embodiment of the disclosure.

A method of allocating time domain resources for a data channel in the next-generation wireless communication system (e.g., 5G or NR system) will be described below.

The base station may configure a table about time domain resource allocation information for a downlink data channel (physical downlink shared channel (PDSCH)) and an uplink data channel (physical uplink shared channel (PUSCH)) for the terminal through higher layer signaling (e.g., RRC signaling). A table including up to maxNrofDL-Allocations=16 entries may be configured for the PDSCH, and a table including up to maxNrofUL-Allocations=16 entries may be configured for the PUSCH. In an embodiment of the disclosure, the time domain resource allocation information may include PDCCH-to-PDSCH slot timing K0 (corresponding to the time interval in slot units between the time when the PDCCH is received and the time when the PDSCH scheduled by the received PDCCH is transmitted), PDCCH-to-PUSCH slot timing K2 (corresponding to the time interval in slot units between the time when the PDCCH is received and the time when the PUSCH scheduled by the received PDCCH is transmitted), information about the position and length of the start symbol where the PDSCH or PUSCH is scheduled in the slot, the mapping type of the PDSCH or PUSCH, or the like. For example, pieces of information such as those in Table 13 or Table 14 below may be notified from the base station to the terminal.

TABLE 13

PDSCH-TimeDomainResourceAllocationList information element

```
PDSCH-TimeDomainResourceAllocationList ::=    SEQUENCE (SIZE(1..maxNrofDL-
Allocations)) OF PDSCH-TimeDomainResourceAllocation
PDSCH-TimeDomainResourceAllocation ::=   SEQUENCE {
    k0                                        INTEGER(0..32)
OPTIONAL,   -- Need S
    (PDCCH-to-PDSCH Timing, Slot Unit)
    mappingType                               ENUMERATED {typeA, typeB},
    (PDSCH Mapping Type)
    startSymbolAndLength                      INTEGER (0..127)
    (Start Symbol and Length of PDSCH)
}
```

TABLE 14

PUSCH-TimeDomainResourceAllocation information element

```
PUSCH-TimeDomainResourceAllocationList ::=    SEQUENCE
(SIZE(1..maxNrofUL-Allocations)) OF PUSCH-TimeDomainResourceAllocation
PUSCH-TimeDomainResourceAllocation ::=   SEQUENCE {
    k2                                        INTEGER(0..32)
OPTIONAL,   -- Need S
    (PDCCH-to-PUSCH Timing, Slot Unit)
    mappingType                               ENUMERATED {typeA, typeB},
    (PUSCH Mapping Type)
    startSymbolAndLength                      INTEGER (0..127)
    (Start Symbol and Length of PUSCH)
}
```

The base station may notify one of the entries in the table about the time domain resource allocation information described above to the terminal through L1 signaling (e.g., DCI) (e.g., the time domain resource allocation information may be indicated by a 'time domain resource allocation' field in the DCI). The terminal may obtain time domain resource allocation information about the PDSCH or PUSCH based on the DCI received from the base station.

FIG. 7 is a diagram illustrating an example of time domain resource allocation of NR.

Referring to FIG. 7, the base station may indicate the time-axis position of a PDSCH resource according to sub-carrier spacings $\mu_{PDSCH}$ and $\mu_{PDCCH}$ of a data channel and a control channel configured by using an upper layer, a scheduling offset $K_0$ value, and/or an OFDM symbol start position 7-00 and a length 7-05 in one slot dynamically indicated through the DCI.

Figure 8:
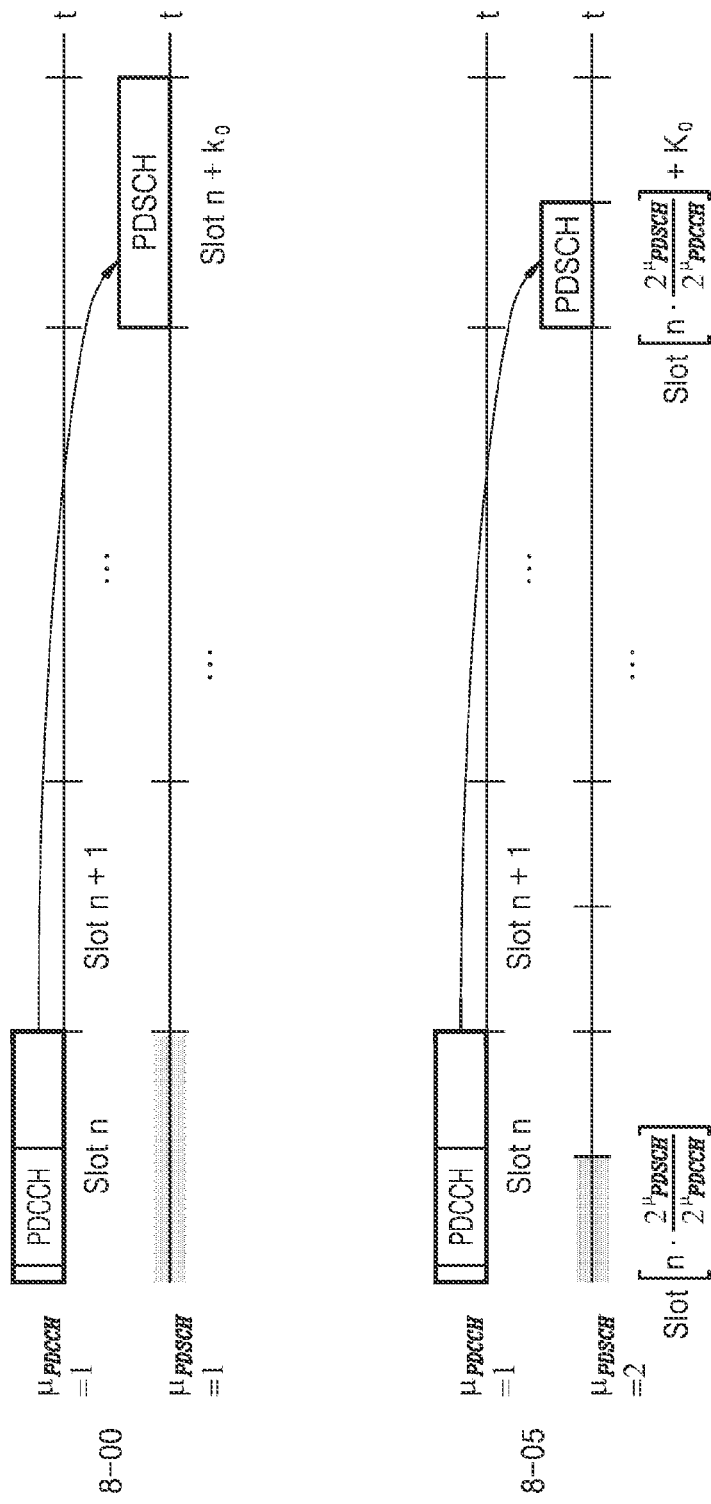
FIG. 8 is a diagram illustrating an example of time domain resource allocation according to subcarrier spacing of a data channel and a control channel in a wireless communication system according to an embodiment of the disclosure.

FIG. 8 is a diagram illustrating an example of time domain resource allocation according to subcarrier spacing of a data channel and a control channel in a wireless communication system according to an embodiment of the disclosure.

Referring to FIG. 8, when the subcarrier spacings of the data channel and the control channel are equal to each other (8-00, $\mu_{PDSCH}=\mu_{PDCCH}$), because the slot numbers for data and control are equal to each other, the base station and the terminal may know that a scheduling offset occurs according to a predetermined slot offset $K_0$. On the other hand, when the subcarrier spacings of the data channel and the control channel are different from each other (8-05, $\mu_{PDSCH}\neq\mu_{PDCCH}$), because the slot numbers for data and control are different from each other, the base station and the terminal may know that a scheduling offset occurs according to a predetermined slot offset $K_0$ based on the subcarrier spacing of the PDCCH.

In the LTE and the NR, the terminal may have a procedure of reporting the capability supported by the terminal to the corresponding base station while connected to the serving base station. In the following description, this will be referred to as UE capability (reporting). The base station may transmit a UE capability enquiry message for requesting a capability report to the terminal in the connected state. The UE capability enquiry message may include a UE capability request for each RAT type of the base station. The request for each RAT type may include requesting frequency band information. Also, a plurality of RAT types may be requested in one RRC message container through the UE capability enquiry message, or a UE capability enquiry message including a request for each RAT type may be transmitted to the terminal while being included a plurality of times. That is, the UE capability enquiry may be repeated a plurality of times, and the terminal may configure and report the corresponding UE capability information message a plurality of times. In the next-generation wireless communication system, a UE capability request for MR-DC including NR, LTE, and EN-DC may be performed. For reference, the terminal may generally transmit the UE capability enquiry message initially after connection; however, the base station may transmit the same in any conditions when necessary.

In the above operation, the terminal having received a UE capability report request from the base station may configure the terminal capability according to the RAT type and band information requested from the base station. A method of configuring, by the terminal, the UE capability in the NR system may be as follows.

1. When the terminal receives a list of LTE and/or NR bands from the base station according to a UE capability request, the terminal may configure a band combination (BC) for EN-DC and NR stand alone (SA). That is, based on the bands requested by the base station with FreqBandList, the terminal may configure a BC candidate list for EN-DC and NR SA. Also, the band may have the priority in the order described in FreqBandList.
2. When the base station requests a UE capability report by setting an "EUTRA-NR-only" flag or a "EUTRA" flag, the terminal may completely remove those for the NR SA BCs from among the configured BC candidate list. This operation may occur only when the LTE base station (eNB) requests "EUTRA" capability.
3. Thereafter, the terminal may remove fallback BCs from the BC candidate list configured in the above operation. Here, the fallback BC may correspond to a case where a band corresponding to at least one SCell is removed from a certain super set BC and may be omitted because the super set BC may already cover the fallback BC. This operation may also be applied in the MR-DC, that is, may also be applied to the LTE bands. The BCs remaining after this operation may be the final "candidate BC list".
4. The terminal may select BCs to be reported by selecting BCs corresponding to the requested RAT type from the final "candidate BC list". In this operation, the terminal may configure supportedBandCombinationList in a given order. That is, the terminal may configure the BC and UE capability to be reported according to the preset rat-Type order. (NR→EUTRA-NR→EUTRA). Also, it may configure featureSetCombination for the configured supportedBandCombinationList and may configure a list of "candidate feature set combination" from the candidate BC list from which a list for fallback BC (including the capability of the same or lower level) has been removed. The "candidate feature set combination" may include all feature set combinations for NR and EUTRA-NR BC and may be obtained from a feature set combination of containers of UE-NR-Capabilities and UE-MRDC-Capabilities.
5. Also, when the requested rat Type is EUTRA-NR and has an effect, featureSetCombinations may be included in both the containers of UE-MRDC-Capabilities and UE-NR-Capabilities. However, the feature set of the NR may include only UE-NR-Capabilities.

After the UE capability is configured, the terminal may transmit a UE capability information message including the UE capability to the base station. Thereafter, the base station may perform scheduling and transmission/reception management suitable for the corresponding terminal based on the UE capability received from the terminal.

The NR may have a CSI framework for indicating channel state information (CSI) measurement and reporting of the terminal in the base station. The CSI framework of the NR may include at least two elements of resource setting and report setting, and report setting may have a connection relationship with reference to at least one ID of resource setting.

According to an embodiment of the disclosure, resource setting may include information related to a reference signal (RS) for measuring, by the terminal, channel state information. The base station may configure at least one resource setting for the terminal. As an example, the base station and the terminal may exchange signaling information such as information in Table 15 in order to transmit information about the resource setting.

TABLE 15

```
-- ASN1START
-- TAG-CSI-RESOURCECONFIG-START
CSI-ResourceConfig ::=            SEQUENCE {
    csi-ResourceConfigId              CSI-ResourceConfigId,
    csi-RS-resourceSetList            CHOICE {
        nzp-CSI-RS-SSB                    SEQUENCE {
            nzp-CSI-RS-ResourceSetList SEQUENCE (SIZE (1..maxNrofNZP-CSI-RS-
ResourceSetsPerConfig)) OF NZP-CSI-RS-ResourceSetId
OPTIONAL,   -- Need R
            csi-SSB-ResourceSetList           SEQUENCE (SIZE (1..maxNrofCSI-SSB-
ResourceSetsPerConfig)) OF CSI-SSB-ResourceSetId
OPTIONAL    -- Need R
        },
        csi-IM-ResourceSetList            SEQUENCE (SIZE (1..maxNrofCSI-IM-
ResourceSetsPerConfig)) OF CSI-IM-ResourceSetId
    },
    bwp-Id                            BWP-Id
    resourceType                        ENUMERATED { aperiodic, semiPersistent, periodic },
    ...
}
-- TAG-CSI-RESOURCECONFIG-STOP
-- ASN1STOP
```

In Table 15, signaling information CSI-ResourceConfig may include information about each resource setting. According to the signaling information, each resource setting may include a resource set list (CSI-RS-ResourceSetList) including a resource setting index (CSI-ResourceConfigId), a BWP index (BWP-ID), a time-axis transmission resource configuration (resourceType), or at least one resource set. The time-axis transmission resource configuration may be configured as aperiodic transmission, semi-persistent transmission, or periodic transmission. The resource set list may be a set including a resource set for channel measurement or a set including a resource set for interference measurement. When the resource set list is a set including a resource set for channel measurement, each resource set may include at least one resource, which may be a CSI reference signal (CSI-RS) resource or an index of a synchronization/broadcast channel block (SS/PBCH block (SSB)). When the resource set list is a set including a resource set for interference measurement, each resource set may include at least one interference measurement resource (CSI interference measurement (CSI-IM)).

As an example, when the resource set includes a CSI-RS, the base station and the terminal may exchange signaling information such as information in Table 16 in order to transmit information about the resource set.

TABLE 16

```
-- ASN1START
-- TAG-NZP-CSI-RS-RESOURCESET-START
NZP-CSI-RS-RosouresSet ::=      SEQUENCE {
    nzp-CSI-ResourceSetId           NZP-CSI-RS-ResourceSetId,
    nzp-CSI-RS-Resources            SEQUENCE (SIZE
(1..maxNrofNZP-CSI-RS-ResourcesPerSet)) OF NZP-CSI-RS-ResourceId,
    repetition                      ENUMERATED { on, off }
OPTIONAL,   -- Need S
    aperiodicTriggeringOffset       INTEGER (0..6)
OPTIONAL,   -- Need S
    trs-Info                        ENUMERATED {true}
OPTIONAL,   -- Need R
    ...
}
-- TAG-NZP-CSI-RS-RESOURCESET-STOP
-- ASN1STOP
```

In Table 16, signaling information NZP-CSI-RS-ResourceSet may include information about each resource set. According to the signaling information, each resource set may include at least information about a resource set index (NZP-CSI-ResourceSetId) or an index set of CSI-RS (NZP-CSI-RS-Resources) and may include information (repetition) about a space-domain transmission filter of CSI-RS resources or some of information (TRS-Info) about the tracking purpose of the CSI-RS resources.

The CSI-RS may be the most representative reference signal included in the resource set. The base station and the terminal may exchange signaling information such as information in [Table 17] in order to transmit information about the CSI-RS resource.

TABLE 17

```
-- ASN1START
-- TAG-NZP-CSI-RS-RESOURCE-START
NZP-CSI-RS-Resource ::=         SEQUENCE {
    nzp-CSI-RS-ResourceId           NZP-CSI-RS-ResourceId,
    resourceMapping                 CSI-RS-ResourceMapping,
    powerControlOffset              INTEGER (-8..15),
    powerControlOffsetSS            ENUMERATED{db-3, db0, db3, db6}
OPTIONAL,   -- Need R
    scramblingID                    ScramblingId,
    periodicityAndOffset            CSI-ResourcePeriodicityAndOffset
OPTIONAL,   -- Cond PeriodicOrSemiPersistent
    gcl-InfoPeriodicSCI-RS          TCI-StateId
OPTIONAL,   -- Cond Periodic
    ...
}
-- TAG-NZP-CSI-RS-RESOURCE-STOP
-- ASN1STOP
```

In Table 17, signaling information NZP-CSI-RS-Resource may include information about each CSI-RS. Information included in the signaling information NZP-CSI-RS-Resource may have the following meanings.

NZP-CSI-RS-ResourceId: CSI-RS resource index resourceMapping: resource mapping information of CSI-RS resource powerControlOffset: Ratio between PDSCH EPRE (Energy Per RE) and CSI-RS EPRE powerControlOffsetSS: Ratio between SS/PBCH block EPRE and CSI-RS EPRE scramblingID: scrambling index of CSI-RS sequence periodicityAndOffset: transmission period and slot offset of CSI-RS resource QCL-InfoPeriodicCSI-RS: TCI-state information when the CSI-RS is periodic CSI-RS The resourceMapping included in the signaling information NZP-CSI-RS-Resource may represent resource mapping information of the CSI-RS resource and may include frequency resource element (RE) mapping, the number of ports, symbol mapping, CDM type, frequency resource density, and/or frequency band mapping information. The number of ports, frequency resource density, CDM type, and/or time-frequency axis RE mapping configurable through this may have values determined in one of the rows of Table 18 below.

TABLE 18

| Row | Ports $\chi$ | Density $\rho$ | cdm-Type | $(\bar{k}, \bar{l})$ | CDM group index j | k' | l' |
|---|---|---|---|---|---|---|---|
| 1 | 1 | 3 | No CDM | $(k_0, l_0)$, $(k_0 + 4, l_0)$, $(k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0)$, $(k_0 + 2, l_0)$ | 0, 1 | 0, 1 | 0 |
| 5 | 4 | 1 | FD-CDM2 | $(k_0, l_0)$, $(k_0, l_0 + 1)$ | 0, 1 | 0, 1 | 0 |
| 6 | 8 | 1 | FD-CDM2 | $(k_0, l_0)$, $(k_1, l_0)$, $(k_2, l_0)$, $(k_3, l_0)$ | 0, 1, 2, 3 | 0, 1 | 0 |
| 7 | 8 | 1 | FD-CDM2 | $(k_0, l_0)$, $(k_1, l_0)$, $(k_0, l_0 + 1)$, $(k_1, l_0 + 1)$ | 0, 1, 2, 3 | 0, 1 | 0 |
| 8 | 8 | 1 | CDM4 (FD2, TD2) | $(k_0, l_0)$, $(k_1, l_0)$ | 0, 1 | 0, 1 | 0, 1 |
| 9 | 12 | 1 | FD-CDM2 | $(k_0, l_0)$, $(k_1, l_0)$, $(k_2, l_0)$, $(k_3, l_0)$, $(k_4, l_0)$, $(k_5, l_0)$ | 0, 1, 2, 3, 4, 5 | 0, 1 | 0 |
| 10 | 12 | 1 | CDM4 (FD2, TD2) | $(k_0, l_0)$, $(k_1, l_0)$, $(k_2, l_0)$ | 0, 1, 2 | 0, 1 | 0, 1 |
| 11 | 16 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$ | 0, 1, 2, 3, 4, 5, 8, 7 | 0, 1 | 0 |
| 12 | 16 | 1, 0.5 | CDM4 (FD2, TD2) | $(k_0, l_0)$, $(k_1, l_0)$, $(k_2, l_0)$, $(k_3, l_0)$ | 0, 1, 2, 3 | 0, 1 | 0, 1 |
| 13 | 24 | 1, 0.5 | FD-CDM2 | $(k_0, l_0)$, $(k_1, l_0)$, $(k_1, l_0)$, $(k_0, l_0 + 1)$, $(k_3, l_0 + 1)$, $(k_2, l_0 + 1)$, $(k_0, l_1)$, $(k_1, l_1)$, $(k_2, l_1)$, $(k_0, l_1 + 1)$, $(k_1, l_1 + 1)$, $(k_1, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | CDM8 (FD2, TD4) | $(k_0, l_0)$, $(k_1, l_0)$, $(k_2, l_0)$ | 0, 1, 2 | 0, 1 | 0, 1, 2, 3 |
| 16 | 32 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, l_1)$, $(k_1, l_1)$, $(k_2, l_1)$, $(k_3, l_1)$ $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0)$, $(k_1, l_0)$, $(k_2, l_0)$, $(k_3, l_0)$ | 0, 1, 2, 3 | 0, 1 | 0, 1, 2, 3 |

Table 18 shows the frequency resource density, the CDM type, the frequency-axis and time-axis start positions of the CSI-RS component RE pattern $(\bar{k}, \bar{l})$, and the frequency-axis RE number (k') and time-axis RE number (l') of the CSI-RS component RE pattern, which may be configured according to the number of CSI-RS ports (X). The above CSI-RS component RE pattern may be a basic unit constituting the CSI-RS resource. Through Y=1+max(k') REs on the frequency axis and Z=1+max(l') REs on the time axis, the CSI-RS component RE pattern may include YZ REs. When the number of CSI-RS ports is 1, the CSI-RS RE position may be designated without limitation on the subcarrier in the PRB and the CSI-RS RE position may be designated by a 12-bit bitmap. When the number of CSI-RS ports is {2, 4, 8, 12, 16, 24, 32} and Y=2, the CSI-RS RE position may be designated for every two subcarriers in the PRB and the CSI-RS RE position may be designated by a 6-bit bitmap. When the number of CSI-RS ports is 4 and Y=4, the CSI-RS RE position may be designated for every four subcarriers in the PRB and the CSI-RS RE position may be designated by a 3-bit bitmap. Similarly, the time-axis RE position may be designated by a bitmap of a total of 14 bits. In this case, according to the Z value in Table 18, the length of the bitmap may be changed as in the frequency position designation; however, the principle thereof may be similar to the above description and thus redundant descriptions thereof will be omitted below for conciseness.

According to an embodiment of the disclosure, the report setting may have a connection relationship with reference to at least one ID of the resource setting, and the resource setting(s) having a connection relationship with the report setting may provide configuration information including information about a reference signal for channel information measurement. When the resource setting(s) having a connection relationship with the report setting is used for channel information measurement, the measured channel information may be used for reporting channel information according to a reporting method configured in the report setting having a connection relationship.

According to an embodiment of the disclosure, the report setting may include configuration information related to a CSI reporting method. As an example, the base station and the terminal may exchange signaling information such as information in Table 19 in order to transmit information about the reporting setting.

TABLE 19

```
-- ASN1START
-- TAG-CSI-REPORTCONFIG-START
CSI-ReportConfig ::=              SEQUENCE {
    reportConfigId                    CSI-ReportConfigId,
    carrier                           ServCellIndex          OPTIONAL,  -- Need S
    resourcesForChannelMeasurement    CSI-ResourceConfigId,
    csi-IM-ResourcesForInterference   CSI-ResourceConfigId-  OPTIONAL,  -- Need R
    nzp-CSI-RS-ResourcesForInterference  CSI-ResourceConfigId  OPTIONAL,  -- Need R
    reportConfigType                  CHOICE {
        periodic                          SEQUENCE {
            ReportSlotConfig                  CSI-ReportPeriodicityAndOffset,
            pucch-CSI-ResourceList                SEQUENCE (SIZE (1..maxNrofBWPs)) OF PUCCH-CSI-Resource
        },
        semiPersistentOnPUCCH             SEQUENCE {
            reportSlotConfig                  CSI-ReportPeriodicityAndOffset,
            pucch-CSI-ResourceList                SEQUENCE (SIZE (1..maxNrofBWPs)) OF PUCCH-CSI-Resource
        },
        semiPersistentOnPUSCH             SEQUENCE {
            reportSlotConfig                  ENUMERATED (sl5, sl10, sl20, sl40, sl80, sl160, sl320},
            reportSlotOffsetList              SEQUENCE (SIZE (1..maxNrofUL-Allocations)) OF INTEGER (0..32),
            p0alpha                           P0-PUSCH-AlphaSetId
        },
        aperiodic                         SEQUENCE {
            reportSlotOffsetList              SEQUENCE (SIZE (1..maxNrofUL-Allocations)) OF INTEGER(0..32)
        }
    },
    reportQuantity                    CHOICE {
        none                              NULL,
        cri-RI-PMI-CQI                    NULL,
        cri-RI-i1                         NULL,
        cri-RI-i1-CQI                     SEQUENCE {
            pdsch-BundleSizeForCSI            ENUMERATED {n2, n4}
        OPTIONAL  -- Need S
        },
        cri-RI-CQI                        NULL,
        cri-RSRP                          NULL,
        ssb-Index-RSRP                    NULL,
        cri-RI-LI-PMI-CQI                 NULL
    },
    reportFreqConfiguration           SEQUENCE {
        cqi-FormatIndicator               ENUMERATED { widebandCQI, subbandCQI }
        OPTIONAL,  -- Need R
        pmi-FormatIndicator               ENUMERATED { widebandPMI, subbandPMI }
        OPTIONAL,  -- Need R
        csi-ReportingBand                 CHOICE {
            subbands3                         BIT STRING (SIZE (3)),
            subbands4                         BIT STRING (SIZE (4)),
            subbands5                         BIT STRING (SIZE (5)),
            subbands6                         BIT STRING (SIZE (6)),
            subbands7                         BIT STRING (SIZE (7)),
            subbands8                         BIT STRING (SIZE (8)),
            subbands9                         BIT STRING (SIZE (9)),
            subbands10                        BIT STRING (SIZE (10)),
            subbands11                        BIT STRING (SIZE (11)),
            subbands12                        BIT STRING (SIZE (12)),
            subbands13                        BIT STRING (SIZE (13)),
            subbands14                        BIT STRING (SIZE (14)),
```

TABLE 19-continued

```
        subbands15              BIT STRING (SIZE (15)),
        subbands16              BIT STRING (SIZE (16)),
        subbands17              BIT STRING (SIZE (17)),
        subbands18              BIT STRING (SIZE (18)),
        ...,
        subbands19-v1530        BIT STRING(SIZE (19))
    }   OPTIONAL    -- Need S
  }
                                OPTIONAL,   -- Need R
  timeRestrictionFoxChannelMeasurements    ENUMERATED {configured, notConfigured},
  timeRestrictionForInterferenceMeasurements  ENUMERATED {configured, notConfigured},
  codebookConfig                CodebookConfig
OPTIONAL,    -- Need R
  dummy                         ENUMERATED {n1, n2}
OPTIONAL,    -- Need R
  groupBasedBeamReporting       CHOICE {
    enabled                       NULL,
    disabled                      SEQUENCE {
      nrofReportedRS                ENUMERATED {n1, n2, n3, n4}
OPTIONAL,    -- Need S
    }
  },
  cqi-Table                ENUMERATED {table1, table2, table3, spare1}
OPTIONAL,    -- Need R
  subbandSize              ENUMERATED {value1, value2},
  non-PMI-PortIndication        SEQUENCE {SIZE (1..maxNrofNZP-CSI-RS-ResourcesPerConfig)) OF
PortIndexFor8Ranks OPTIONAL,    -- Need R
  ...,
  [[
  semiPersistentOnPUSCH-v1530   SEQUENCE {
    reportSlotConfig-v1530        ENUMERATED{sl4, sl8, sl16}
  }                               OPTIONAL   -- Need R
  ]]
}
```

In Table 19, signaling information CSI-ReportConfig may include information about each report setting. Information included in the signaling information CSI-ReportConfig may have the following meanings.
reportConfigId: report setting index
carrier: serving cell index
resourcesForChannelMeasurement: resource setting index for channel measurement having a connection relationship with report setting
CSI-IM-ResourcesForInterference: resource setting index having a CSI-IM resource for interference measurement having a connection relationship with report setting
NZP-CSI-RS-ResourcesForInterference: resource setting index having a CSI-RS resource for interference measurement having a connection relationship with report setting
reportConfigType: it may represent the time-axis transmission configuration and transmission channel of the channel report and may have aperiodic transmission, semi-persistent PUCCH (Physical Uplink Control Channel) transmission, semi-periodic PUSCH transmission, or periodic transmission configuration
reportQuantity: it may represent the type of channel information to be reported and may have the type of channel information when the channel report is not transmitted ('none') and when the channel report is transmitted ('cri-RI-PMI-CQI', 'cri-RI-i1', 'cri-RI-i1-CQI', 'cri-RI-CQI', 'cri-RSRP', 'ssb-Index-RSRP', and 'cri-RI-LI-PMI-CQI'). Here, the elements included in the type of channel information may mean CQI (Channel Quality Indicator), PMI (Precoding Matric Indicator), CRI (CSI-RS Resource Indicator), SSBRI (SS/PBCH Block Resource Indicator), Layer Indicator (LI), Rank Indicator (RI), and/or L1-RSRP (Reference Signal Received Power).
reportFreqConfiguration: it may indicate whether the reported channel information includes only information about the entire band (wideband) or includes information about each subband and may have configuration information about a subband including channel information when it includes information about each subband
timeRestrictionForChannelMeasurements: information about time-axis limitation on reference signal for channel measurement among reference signals referenced by channel information to be reported
timeRestrictionForInterferenceMeasurements: information about time-axis limitation on reference signal for interference measurement among reference signals referenced by channel information to be reported
codebookConfig: codebook information referenced by channel information to be reported
groupBasedBeamReporting: information about beam grouping in channel report
CQI-Table: CQI table index referenced by channel information to be reported
subbandSize: index representing subband size of channel information
non-PMI-PortIndication: port mapping information referenced when reporting non-PMI channel information When the base station instructs a channel information report through higher layer signaling or L1 signaling, the terminal may perform a channel information report with reference to the above configuration information included in the indicated report setting.

The base station may indicate channel state information (CSI) reporting to the terminal through higher layer signaling including RRC (Radio Resource Control) signaling or MAC (Medium Access Control) CE (Control Element) signaling or through L1 signaling (e.g., common DCI, group-common DCI, or UE-specific DCI).

For example, the base station may indicate an aperiodic channel information report (CSI report) to the terminal through higher layer signaling or DCI using DCI format 0_1. The base station may configure a plurality of CSI report trigger states including a parameter for an aperiodic CSI report of the terminal or a parameter for a CSI report through higher layer signaling. The parameter for a CSI report or the CSI report trigger state may include a set including a slot interval or possible slot interval between the PDCCH including DCI and the PUCCH (Physical Uplink Control Channel) or the PUSCH including a CSI report, a reference signal ID for channel state measurement, a type of included channel information, and/or the like. When the base station indicates some of a plurality of CSI report trigger states to the terminal through the DCI, the terminal may report channel information according to the CSI report setting of the report setting configured in the indicated CSI report trigger state. The time domain resource allocation of the PUCCH or PUSCH including the CSI report of the terminal may be indicated by some or all of the slot interval with the PDCCH indicated through the DCI, the start symbol and symbol length indication in the slot for the time domain resource allocation of the PUSCH, and the PUCCH resource indication. For example, the position of the slot in which the PUSCH including the CSI report of the terminal is transmitted may be indicated through the slot interval with the PDCCH indicated through the DCI, and the start symbol and symbol length in the slot may be indicated through the time domain resource assignment field of the DCI described above.

For example, the base station may indicate a semi-persistent CSI report to the terminal through higher layer signaling or DCI using DCI format 0_1. The base station may activate or deactivate the semi-persistent CSI report through higher layer signaling including MAC CE signaling or DCI scrambled by SP-CSI-RNTI. When the semi-persistent CSI report is activated, the terminal may periodically report channel information according to the configured slot interval. When the semi-persistent CSI report is deactivated, the terminal may stop reporting the activated periodic channel information. The base station may configure a plurality of CSI report trigger states including a parameter for a semi-persistent CSI report of the terminal or a parameter for a semi-persistent CSI report through higher layer signaling.

The parameter for the CSI report or the CSI report trigger state may include a set including the slot interval or possible slot interval between the PDCCH including the DCI indicating the CSI report and the PUCCH or PUSCH including the CSI report, a slot interval between the slot in which higher layer signaling indicated by the CSI report is activated and the PUCCH or PUSCH including the CSI report, a slot interval period of the CSI report, a type of included channel information, and/or the like. When the base station activates some of a plurality of CSI report trigger states or some of a plurality of report settings to the terminal through higher layer signaling or DCI, the terminal may report channel information according to the report setting included in the indicated CSI report trigger state or the CSI report setting configured in the activated report setting. The time domain resource allocation of the PUCCH or PUSCH including the CSI report of the terminal may be indicated by some or all of the slot interval period of the CSI report, the slot interval with the slot in which higher layer signaling is activated or the slot interval with the PDCCH indicated through the DCI, the start symbol and symbol length indication in the slot for the time domain resource allocation of the PUSCH, and the PUCCH resource indication. For example, the position of the slot in which the PUSCH including the CSI report of the terminal is transmitted may be indicated through the slot interval with the PDCCH indicated through the DCI, and the start symbol and symbol length in the slot may be indicated through the time domain resource assignment field of DCI format 0_1 described above. For example, the position of the slot in which the PUCCH including the CSI report of the terminal is transmitted may be indicated by the slot interval period of the CSI report configured through higher layer signaling, the slot interval between the slot in which higher layer signaling is activated and the PUCCH including the CSI report, and the start symbol and symbol length in the slot may be indicated through the start symbol and symbol length to which the PUCCH resource configured through higher layer signaling is allocated.

For example, the base station may indicate a periodic CSI report to the terminal through higher layer signaling. The base station may activate or deactivate the periodic CSI report through higher layer signaling including RRC signaling. When the periodic CSI report is activated, the terminal may periodically report channel information according to the configured slot interval. When the periodic CSI report is deactivated, the terminal may stop reporting the activated periodic channel information. The base station may configure report setting including a parameter for the periodic CSI report of the terminal through higher layer signaling. The parameter for the CSI report may include the slot interval between the slot in which higher layer signaling indicating the CSI report is activated and the PUCCH or PUSCH including the CSI report, the slot interval period of the CSI report, the reference signal ID for channel state measurement, the type of included channel information, and/or the like. The time domain resource allocation of the PUCCH or PUSCH including the CSI report of the terminal may be indicated by some or all of the slot interval period of the CSI report, the slot interval with the slot in which higher layer signaling is activated or the slot interval with the PDCCH indicated through the DCI, the start symbol and symbol length indication in the slot for the time domain resource allocation of the PUSCH, and the PUCCH resource indication. For example, the position of the slot in which the PUCCH including the CSI report of the terminal is transmitted may be indicated by the slot interval period of the CSI report configured through higher layer signaling, the slot interval between the slot in which higher layer signaling is activated and the PUCCH including the CSI report, and the start symbol and symbol length in the slot may be indicated through the start symbol and symbol length to which the PUCCH resource configured through higher layer signaling is allocated.

When the base station indicates an aperiodic CSI report or a semi-persistent CSI report to the terminal through the DCI, the terminal may determine whether valid channel reporting may be performed through the indicated CSI report by considering the channel calculation time (CSI computation time) required for the CSI report. With respect to the aperiodic CSI report or semi-persistent CSI report indicated through the DCI, the terminal may perform a valid CSI report from an uplink symbol after a Z symbol after the end of the last symbol included in the PDCCH including the DCI indicating the CSI report. The above Z symbol may vary according to the numerology of the downlink bandwidth part corresponding to the PDCCH including the DCI indicating the CSI report, the numerology of the uplink bandwidth part corresponding to the PUSCH transmitting the CSI report, or the types of characteristics (the report quantity, the frequency band granularity, the number of ports of the reference signal, the codebook type, and/or the like) of the channel information reported in the CSI report. In other words, in order for a certain CSI report to be determined as a valid CSI report (for a corresponding CSI report to be a valid CSI report), uplink transmission of the CSI report may include timing advance and thus should not be performed before a Zref symbol. In this case, the Zref symbol may be an uplink symbol that starts a cyclic prefix (CP) after a time $T_{proc,CSI}=(Z)(2048+144)\cdot\kappa2^{-\mu}\cdot T_C$ from the end of the last symbol of the triggering PDCCH. Here, a detailed value of Z follows the following description, $T_c=1/(\Delta f_{max}\cdot N_f)$, $\Delta f_{max}=480\cdot10^3$ Hz, $N_f=4096$, $\kappa=64$ and $\mu$ is numerology. In this case, $\mu$ may be promised to use the one causing the greatest $T_{proc,CSI}$ value among ($\mu_{PDCCH}$, $\mu_{CSI-RS}$, $\mu_{UL}$), PDCCH may represent the subcarrier spacing used for PDCCH transmission, $\mu_{CSI-RS}$ may represent the subcarrier spacing used for CSI-RS transmission, and $\mu_{UL}$ may represent the subcarrier spacing of the uplink channel used for UCI (uplink control information) transmission for CSI reporting. As another example, $\mu$ may be promised to use the one causing the greatest $T_{proc,CSI}$ value among ($\mu_{PDCCH}$, $\mu_{UL}$). The definition of $\mu_{PDCCH}$ and $\mu_{UL}$ may refer to the above description. Hereinafter, for convenience of description, satisfying the above condition will be referred to as satisfying a CSI reporting validity condition 1.

Also, when a reference signal for channel measurement about the aperiodic CSI report indicated to the terminal through the DCI is an aperiodic reference signal, a valid CSI report may be performed from the uplink symbol after a Z' symbol after the end of the last symbol including the reference signal, and the Z symbol may vary according to the numerology of the downlink bandwidth part corresponding to the PDCCH including the DCI indicating the CSI report, the numerology of the bandwidth corresponding to the reference signal for channel measurement about the CSI report, the numerology of the uplink bandwidth part corresponding to the PUSCH transmitting the CSI report, and the types or characteristics (report quantity, frequency band granularity, number of reference signal ports, codebook type, or the like) of the channel information reported in the CSI report. In other words, in order for a certain CSI report to be determined as a valid CSI report (for a corresponding CSI report to be a valid CSI report), uplink transmission of the CSI report may include timing advance and thus should not be performed before a Zref symbol. In this case, the Zref symbol may be an uplink symbol that starts a cyclic prefix (CP) after a time $T'_{proc,CSI}=(Z')(2048+144)\cdot\kappa2^{-\mu}\cdot T_C$ from the end of the last symbol of an aperiodic CSI-RS or an aperiodic CSI-IM triggered by the triggering PDCCH. Here, a detailed value of Z' follows the following description, $T_c=1/(\Delta f_{max}\cdot N_f)$, $\Delta f_{max}=480\cdot10^3$ Hz, $N_f=4096$, $\kappa=64$, and $\mu$ is numerology. In this case, $\mu$ may be promised to use the one causing the greatest $T_{proc,CSI}$ value among ($\mu_{PDCCH}$, $\mu_{CSI-RS}$, $\mu_{UL}$), $\mu_{PDCCH}$ may represent the subcarrier spacing used for triggering PDCCH transmission, $\mu_{CSI-RS}$ may represent the subcarrier spacing used for CSI-RS transmission, and $\mu_{UL}$ may represent the subcarrier spacing of the uplink channel used for UCI (uplink control information) transmission for CSI reporting. As another example, $\mu$ may be promised to use the one causing the greatest $T_{proc,CSI}$ value among ($\mu_{PDCCH}$, $\mu_{UL}$). In this case, the definition of $\mu_{PDCCH}$ and $\mu_{UL}$ may refer to the above description. Hereinafter, for convenience of description, satisfying the above condition will be referred to as satisfying a CSI reporting validity condition 2.

When the base station indicates an aperiodic CSI report for an aperiodic reference signal to the terminal through the DCI, the terminal may perform a valid CSI report from the first uplink symbol satisfying both the time point after a Z symbol after the end of the last symbol included in the PDCCH including the DCI indicating the CSI report and the time point after a Z' symbol after the end of the last symbol including the reference signal. That is, in the case of aperiodic CSI reporting based on an aperiodic reference signal, it may be determined as a valid CSI report when both the CSI reporting validity conditions 1 and 2 are satisfied.

When the CSI report time indicated by the base station does not satisfy the CSI computation time requirement, the terminal may determine that the CSI report is invalid and may not consider updating the channel information state for the CSI report.

The Z and Z symbols for calculation of the above CSI computation time may follow Table 20 and Table 21 below. For example, when the channel information reported in the CSI report includes only wideband information, the number of ports of the reference signal is 4 or less, the reference signal resource is one, the codebook type is 'typeI-SinglePanel', or the type of channel information to be reported (report quantity) is 'cri-RI-CQI', the Z and Z' symbols may follow the $Z_1$ and $Z_1$' values of Table 21. Hereinafter, this will be referred to as a delay requirement 2. Also, when the PUSCH including the CSI report does not include TB or HARQ-ACK and the CPU occupation by the terminal is 0, the Z and Z symbols may follow the $Z_1$ and $Z_1$' values of Table 20, which will be referred to as a delay requirement 1. The above CPU occupation will be described below in detail. Also, when the report quantity is 'cri-RSRP' or 'ssb-Index-RSRP', the Z and Z' symbols may follow the $Z_3$ and $Z_3$' values of Table 21. The $X_1$, $X_2$, $X_3$, and $X_4$ of Table 21 may represent the terminal capability (UE capability) for the beam report time and may represent the terminal capability for the $KB_1$ and $KB_2$ beam change times of Table 21. When not corresponding to the types or characteristics of the channel information reported in the CSI report described above, the Z and Z' symbols may follow the $Z_2$ and $Z_2$' values of Table 21.

TABLE 20

| | $Z_1$ [symbols] | |
| --- | --- | --- |
| µ | $Z_1$ | $Z_1$' |
| 0 | 10 | 8 |
| 1 | 13 | 11 |
| 2 | 25 | 21 |
| 3 | 43 | 36 |

TABLE 21

| | $z_1$ [symbols] | | $z_2$ [symbols] | | $z_3$ [symbols] | |
| --- | --- | --- | --- | --- | --- | --- |
| µ | $z_1$ | $z'_1$ | $z_2$ | $z'_2$ | $z_3$ | $z'_3$ |
| 0 | 22 | 16 | 40 | 37 | 22 | $x_1$ |
| 1 | 33 | 30 | 72 | 69 | 33 | $x_2$ |
| 2 | 44 | 42 | 141 | 140 | min(44, $X_3$ + $KB_1$) | $x_3$ |
| 3 | 97 | 85 | 152 | 140 | min(97, $X_4$ + $KB_2$) | $x_4$ |

When the base station indicates an aperiodic/semi-persistent/periodic CSI report to the terminal, a CSI reference resource may be configured in slot units to determine a reference time of a reference signal for measuring channel information reported in the CSI report. For example, when it is indicated to transmit a CSI report #X in an uplink slot n', the CSI reference resource of the CSI report #X transmitted in the uplink slot n' may be defined as a downlink slot n-$n_{CSI-ref}$. The downlink slot n may be calculated as n=$\lfloor n' \cdot 2^{\mu_{DL}}/2^{\mu_{UL}} \rfloor$ by considering the downlink and uplink numerology $\mu_{DL}$ and $\mu_{UL}$. When the CSI report #0 transmitted in the uplink slot n' is a semi-persistent or periodic CSI report, the $n_{CSI-ref}$ that is the slot interval between the downlink slot n and the CSI reference resource may follow $n_{CSI-ref}=4\cdot 2^{\mu_{DL}}$ when a single CSI-RS resource is connected to the CSI report according to the number of CSI-RS resources for channel measurement and may follow $n_{CSI-ref}=5\cdot 2^{\mu_{DL}}$ when multiple CSI-RS resources are connected to the CSI report. When the CSI report #0 transmitted in the uplink slot n' is an aperiodic CSI report, it may be calculated as n $n_{CSI-ref}=\lfloor Z'/N_{symb}^{slot} \rfloor$ by considering a CSI computation time Z for channel measurement. The above $N_{symb}^{slot}$ may be the number of symbols included in one slot, and $N_{symb}^{slot}=14$ may be assumed in the NR.

When the base station indicates the terminal to transmit a certain CSI report in the uplink slot n' through higher layer signaling or DCI, the terminal may report the CSI by performing channel measurement or interference measurement on a CSI-RS resource, a CSI-IM resource, or an SSB resource transmitted no later than the CSI reference resource slot of the CSI report transmitted in the uplink slot n' among the CSI report resources or the CSI-IM or SSB resources associated with the CSI report. The CSI-RS resource, the CSI-IM resource, or the SSB resource associated with the CSI report may be a CSI-RS resource, a CSI-IM resource, or an SSB resource included in the resource set configured in the resource setting referenced by the report setting for the CSI report of the terminal configured through higher layer signaling or may refer to a CSI-RS resource, a CSI-IM resource, or an SSB resource referenced by a CSI report trigger state including a parameter for the CSI report or a CSI-RS resource, a CSI-IM resource, or an SSB resource indicated by the ID of a reference signal (RS) set.

In embodiments of the disclosure, the CSI-RS/CSI-IM/SSB occasion may represent the transmission time of the CSI-RS/CSI-IM/SSB resource(s) determined by upper layer configuration or by a combination of upper layer configuration and DCI triggering. For example, in the semi-persistent or periodic CSI-RS resource, a transmitted slot may be determined according to a slot period and a slot offset configured by higher layer signaling, and the transmission symbol(s) in the slot may be determined with reference to one of the resource mapping methods in the slot of Table 18 according to resource mapping information (resourceMapping). As another example, in the aperiodic CSI-RS resource, a transmitted slot may be determined according to a slot offset with the PDCCH including the DCI indicating the channel report configured by higher layer signaling, and the transmission symbol(s) in the slot may be determined with reference to one of the resource mapping methods in the slot of Table 18 according to resource mapping information (resourceMapping).

The above CSI-RS occasion may be determined by independently considering the transmission time of each CSI-RS resource or by comprehensively considering the transmission time of one or more CSI-RS resource(s) included in the resource set, and accordingly, the following two interpretations may be possible with respect to the CSI-RS occasion according to each resource set configuration.

Interpretation 1-1: from the start time of the earliest symbol to the end time of the latest symbol in which one particular resource among one or more CSI-RS resources included in the resource set(s) configured in the resource setting referenced by the report setting configured for the CSI report is transmitted Interpretation 1-2: among all the CSI-RS resources included in the resource set(s) configured in the resource setting referenced by the report setting configured for the CSI report, from the start time of the earliest symbol in which the CSI-RS resource transmitted at the earliest time is transmitted to the end time of the latest symbol in which the CSI-RS resource transmitted at the latest time is transmitted Hereinafter, in embodiments of the disclosure, it may be individually applied by considering both the interpretations of the CSI-RS occasion. Also, both the interpretations may be considered for the CSI-IM occasion and the SSB occasion like the CSI-RS occasion; however, the principle thereof may be similar to the above description and thus redundant descriptions thereof will be omitted below for conciseness.

In embodiments of the disclosure, the CSI-RS/CSI-IM/SSB occasion for the CSI report #X transmitted in the uplink slot n' may refer to a set of the CSI-RS occasion, the CSI-IM occasion, and the SSB occasion not later than the CSI reference resource transmitted in the uplink slot n', among the CSI-RS occasions, the CSI-IM occasions, and the SSB occasions of the CSI-RS resources, the CSI-IM resources, and the SSB resources included in the resource set configured in the resource setting referenced by the report setting configured for the CSI report #X.

In embodiments of the disclosure, the latest CSI-RS/CSI-IM/SSB occasion among the CSI-RS/CSI-IM/SSB occasions for the CSI report #X transmitted in the uplink slot n' may follow the following two interpretations.

Interpretation 2-1: a set of occasions including the latest CSI-RS occasion among the CSI-RS occasions for the CSI report #X transmitted in the uplink slot n', the latest CSI-IM occasion among the CSI-RS occasions for the CSI report #X transmitted in the uplink slot n', and the latest SSB occasion among the SSB occasions for the CSI report #0 transmitted in the uplink slot n'

Interpretation 2-2: the latest occasion among all of the CSI-RS occasion, the CSI-IM occasion, and the SSB occasion for the CSI report #X transmitted in the uplink slot n'

In embodiments of the disclosure, it may be individually applied by considering both the interpretations on the latest CSI-RS/CSI-IM/SSB occasion among the CSI-RS/CSI-IM/SSB occasions for the CSI report #X transmitted in the uplink slot n'. Also, in embodiments of the disclosure, when considering the above two interpretations (interpretation 1-1 and interpretation 1-2) on the CSI-RS occasion, the CSI-IM occasion, and the SSB occasion, the latest CSI-RS/CSI-IM/SSB occasion among the CSI-RS/CSI-IM/SSB occasions for the CSI report #X transmitted in the uplink slot n' may be individually applied by considering all of the four different interpretations (application of interpretation 1-1 and Interpretation 2-1, application of Interpretation 1-1 and Interpretation 2-2, application of Interpretation 1-2 and Interpretation 2-1, and application of Interpretation 1-2 and Interpretation 2-2).

The base station may indicate the CSI report by considering the amount of channel information that the terminal may simultaneously calculate for the CSI report, that is, the number of channel information calculation units (CPUs) of the terminal. When the number of channel information calculation units that the UE may simultaneously calculate is $N_{CPU}$, the terminal may not expect a CSI report indication from the base station requiring more channel information calculation than $N_{CPU}$ or may not consider updating channel information requiring more channel information calculation than $N_{CPU}$. $N_{CPU}$ may be reported by the terminal to the base station through higher layer signaling or may be configured by the base station through higher layer signaling.

It is assumed that the CSI report indicated by the base station to the terminal occupies a part or all of the CPU for channel information calculation among the total number $N_{CPU}$ of pieces of channel information that the terminal may simultaneously calculate. As for each CSI report, for example, when the number of channel information calculation units required for the CSI report n (n=0, 1, ..., N−1) is $O_{CPU}^{(n)}$, the number of channel information calculation units for a total of N CSI reports may be referred to as $\Sigma_{n=0}^{N-1} O_{CPU}^{(n)}$. When the number of channel information calculations required by the terminal for multiple CSI reports at a particular time is greater than the number $N_{CPU}$ of channel information calculation units that the terminal may simultaneously calculate, the terminal may not consider updating channel information for some CSI reports. Among a plurality of indicated CSI reports, a CSI report not considering the update of channel information may be determined by considering at least the time required for channel information calculation by the CPU required for the CSI report and the importance or priority of reported channel information. For example, the channel information calculation required for the CSI report may not consider the update of channel information for the CSI report in which the time of occupation of the CPU starts at the latest time and may not preferentially consider the update of channel information for the CSI report with a low priority of channel information.

The CSI priority may be determined with reference to Table 22 below.

TABLE 22

CSI priority value $Pri_{iCSI}(y, k, c, s) = 2 \cdot N_{cells} \cdot M_s \cdot y + N_{cells} \cdot M_s \cdot k + M_s \cdot c + s$,
  y = 0 for aperiodic CSI report transmitted through PUSCH, y = 1 for semi-persistent CSI report transmitted through PUSCH, y = 2 for semi-persistent CSI report transmitted through PUCCH, y = 3 for periodic CSI report transmitted through PUCCH;
  k = 0 when CSI report includes L1-RSRP, k = 1 when CSI report does not include L1-RSRP;
  c: Serving cell index, Ncells: Maximum number of serving cells configured by higher layer signaling (maxNrofservingCells);
  s: CSI report configuration index (reportConfigID), $M_s$: Maximum number of CSI report configurations configured by higher layer signaling (maxNrofCSIReportConfigurations).

The CSI priority for the CSI report may be determined through the priority value $Pri_{CSI}(y,k,c,s)$ of Table 22. Referring to Table 22, the CSI priority value may be determined through the type of channel information included in the CSI report, the time-axis reporting characteristics of the CSI report (aperiodic, semi-persistent, periodic), and the channel through which the CSI report is transmitted (PUSCH, PUCCH), the serving cell index, and the CSI report configuration index. The CSI priority for the CSI report may be determined as having a high CSI priority for the CSI report having a low priority value in comparison with the priority value $Pri_{CSI}(y,k,c,s)$.

Assuming that a CPU occupation time is the time of occupation of the CPU for calculating the channel information required for the CSI report indicated by the base station to the terminal, the CPU occupation time may be determined by considering the type of channel information included in the CSI report (report quantity) and the time-axis characteristics of the CSI report (aperiodic, semi-persistent, periodic), the slot or symbol occupied by the higher layer signaling or DCI indicating the CSI report, or a part or all of the slot or symbol occupied by the reference signal for channel state measurement.

Figure 9:
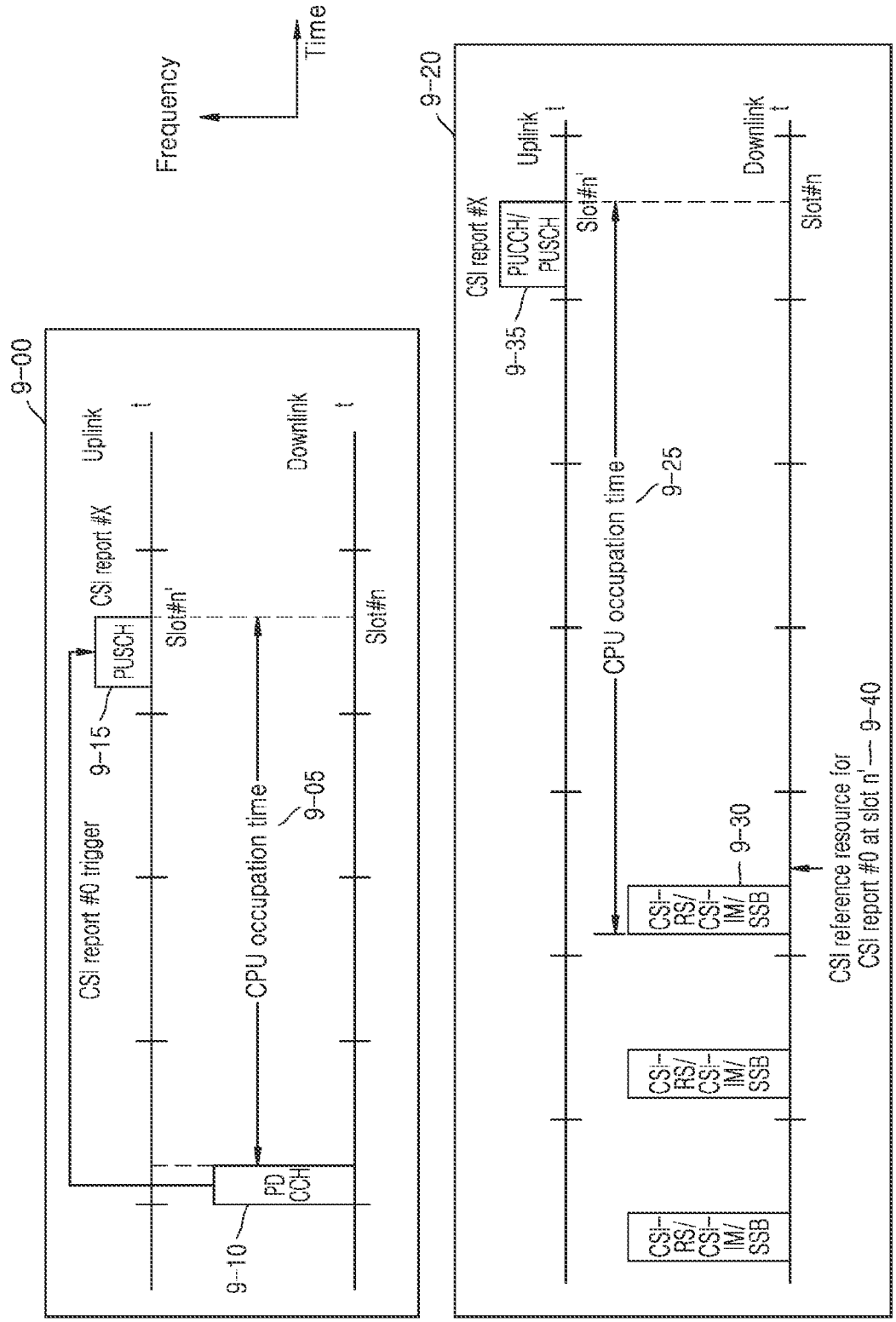
FIG. 9 is a diagram illustrating an example of a CPU occupation time for a CSI report in which a report quantity included in the CSI report is not configured as 'none', according to some embodiments.

FIG. 9 is a diagram illustrating an example of a CPU occupation time for a CSI report in which a report quantity included in the CSI report is not configured as 'none', according to some embodiments.

9-00 of FIG. 9 is a diagram illustrating a CPU occupation time for an aperiodic CSI report in which a report quantity included in the CSI report is not configured as 'none', according to some embodiments. When the base station indicates to transmit an aperiodic CSI report #X in the uplink slot n' through the DCI using DCI format 0_1, the CPU occupation time (9-05) for the CSI report #X transmitted in the uplink slot n' may be defined as the time from the symbol next the last symbol occupied by the PDCCH (9-10) including the DCI indicating the aperiodic CSI report #0 to the last symbol occupied by the PUSCH (9-15) including the CSI report #X transmitted in the uplink slot n'.

9-20 of FIG. 9 is a diagram illustrating a CPU occupation time for a periodic or semi-persistent CSI report in which a report quantity included in the CSI report is not configured as 'none', according to some embodiments. When the base station indicates to transmit a periodic or semi-persistent CSI report #X in the uplink slot n' through the higher layer signaling or the DCI using DCI format 0_1 scrambled by SP-CSI-RNTI, the CPU occupation time (9-25) for the CSI report #X transmitted in the uplink slot n' may be defined as the time from the first symbol of the first-transmitted CSI-RS/CSI-IM/SSB resource corresponding to the latest CSI-RS/CSI-IM/SSB occasion (9-35) among the CSI-RS/CSI-IM/SSB occasions for the CSI report #X transmitted in the uplink slot n' to the last symbol occupied by the PUCCH or PUSCH (9-35) including the CSI report #X transmitted in the uplink slot n'.

Exceptionally, when the base station indicates the semi-persistent CSI report through the DCI and thus the terminal performs the first CSI report of the semi-persistent CSI report #X, the CPU occupation time for the first CSI report may be defined as the time from the symbol next the last symbol occupied by the PDCCH including the DCI indicating the semi-persistent CSI report #X to the last symbol occupied by the PUSCH including the first CSI report. Accordingly, the operation causality on the time axis of the terminal may be ensured by considering the time at which the CSI report is indicated and the time at which the CPU occupation time starts.

As an example, the CPU occupation time may follow the rule illustrated in Table 23 below.

TABLE 23

For a CSI report with CSI-ReportConfig with higher layer parameter reportQuantity not set to 'none', the CPU(s) are occupied for a number of OFDM symbols as follows:
  A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
  An aperiodic CSI report occupies CPU(s) from the first symbol after the PDCCH triggering the CSI report until the last symbol of the PUSCH carrying the report.
  An initial semi-persistent CSI report on PUSCH after the PDCCH trigger occupies CPU(s) from the first symbol after the PDCCH until the last symbol of the PUSCH carrying the report.

Figure 10:
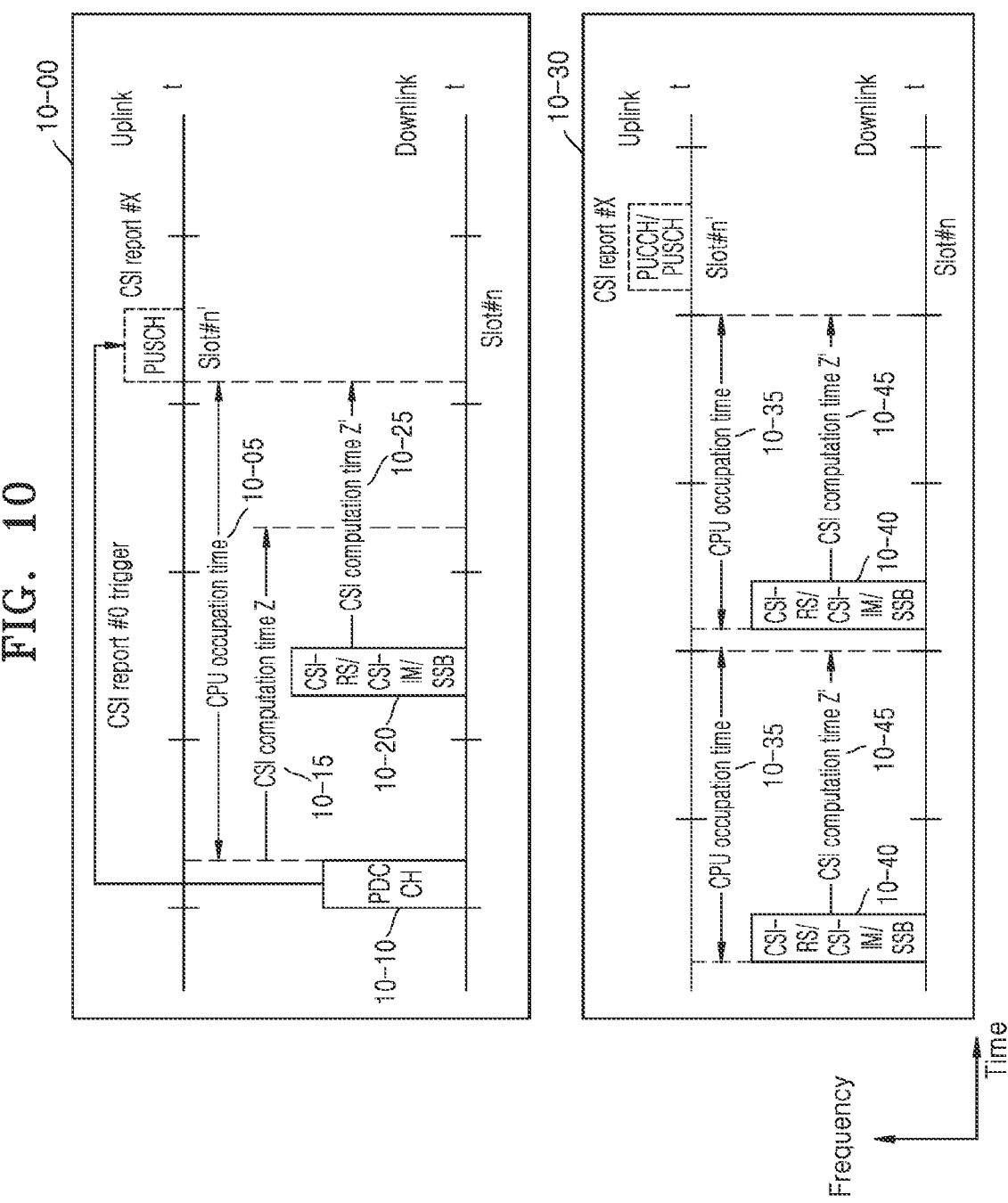
FIG. 10 is a diagram illustrating an example of a CPU occupation time for a CSI report in which a report quantity included in the CSI report is configured as 'none', according to some embodiments.

FIG. 10 is a diagram illustrating an example of a CPU occupation time for a CSI report in which a report quantity included in the CSI report is configured as 'none', according to some embodiments.

10-00 of FIG. 10 is a diagram illustrating a CPU occupation time for an aperiodic CSI report in which a report quantity included in the CSI report is configured as 'none', according to some embodiments. When the base station indicates to transmit an aperiodic CSI report #X in the uplink slot n' through the DCI using DCI format 0_1, the CPU occupation time (10-05) for the CSI report #X transmitted in the uplink slot n' may be defined as the time from the symbol next the last symbol occupied by the PDCCH (10-10) including the DCI indicating the aperiodic CSI report #0 to the symbol in which CSI computation is terminated. The above symbol in which the CSI computation is terminated may refer to the latest symbol among the symbol after the CSI computation time Z (10-15) of the last symbol occupied by the PDCCH including the DCI indicating the CSI report #0 and the symbol after the CSI computation time Z' (10-25) of the last symbol of the latest CSI-RS/CSI-IM/SSB occasion (10-20) for the CSI report #0 transmitted in the uplink slot n'.

10-30 of FIG. 10 is a diagram illustrating a CPU occupation time for a periodic or semi-persistent CSI report in which a report quantity included in the CSI report is configured as 'none', according to some embodiments. When the base station indicates to transmit a periodic or semi-persistent CSI report #X in the uplink slot n' through the higher layer signaling or the DCI using DCI format 0_1 scrambled by SP-CSI-RNTI, the CPU occupation time (10-35) for the CSI report #X transmitted in the uplink slot n' may be defined as the time from the first symbol of the first-transmitted CSI-RS/CSI-IM/SSB resource corresponding to each CSI-RS/CSI-IM/SSB occasion (10-40) transmitted in the uplink slot n' to the symbol after the CSI computation time Z' (10-45) of the last symbol of the latest-transmitted CSI-RS/CSI-IM/SSB resource.

As an example, the CPU occupation time may follow the rule illustrated in Table 24 below.

TABLE 24

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:
  A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z_3$' symbols after the last symbol of the latest one of the CSI-RS/SSB resource for channel measurement for L1-RSRP computation in each transmission occasion.
  An aperiodic CSI report occupies CPU(s) from the first symbol after the PDCCH triggering the CSI report until the last symbol between $Z_3$ symbols after the first symbol after the PDCCH triggering the CSI report and $Z_3$' symbols after the last symbol of the latest one of each CSI-RS/SSB resource for channel measurement for L1-RSRP computation.

In the disclosure, the base station may determine whether to perform a valid CSI report by considering the terminal's power saving operation (e.g., cross-slot scheduling), determine a CSI reference resource, determine the CPU occupation time, or provide methods such as assuming a buffering operation in a particular interval, thus improving the efficiency of the indication and channel state measurement for the CSI report of the base station and the terminal.

Hereinafter, embodiments of the disclosure will be described in detail with reference to the accompanying drawings. In the following description of the disclosure, detailed descriptions of well-known functions or configurations will be omitted because they would unnecessarily obscure the subject matters of the disclosure. Also, terms described below may be terms defined considering functions in the disclosure and may vary according to users' or operators' intentions or practices. Therefore, the definition thereof should be made based on the content throughout the specification.

Hereinafter, in the disclosure, the above examples will be described through a plurality of embodiments; however, they are not independent of each other and one or more embodiments may be applied simultaneously or in combination.

Embodiment 1: Terminal Power Saving Operation Through Cross-Slot Scheduling

In Embodiment 1 below, a method of allocating data channel time domain resources for power saving of a terminal in a next-generation wireless communication system (5G or NR system) will be described.

The base station may configure a table about time domain resource allocation information for the PDSCH (Physical Downlink Shared Cannel) and the PUSCH (Physical Uplink Shared Channel) for the terminal through higher layer signaling (e.g., SIB or RRC signaling). The base station may configure a table including up to maxNrofDL-Allocations=16 entries for the PDSCH and may configure a table including up to maxNrofUL-Allocations=16 entries for the PUSCH. For example, the time domain resource allocation information may include PDCCH-to-PDSCH slot timing K0 (corresponding to the time interval in slot units between the time when the PDCCH is received and the time when the PDSCH scheduled by the received PDCCH is transmitted), PDCCH-to-PUSCH slot timing K2 (corresponding to the time interval in slot units between the time when the PDCCH is received and the time when the PUSCH scheduled by the received PDCCH is transmitted), information about the position and length of the start symbol where the PDSCH or PUSCH is scheduled in the slot, the mapping type of the PDSCH or PUSCH, or the like. For example, pieces of information such as those in Table 13 and Table 14 may be notified from the base station to the terminal.

According to an embodiment of the disclosure, the base station may notify one of the entries in the table about the time domain resource allocation information to the terminal through L1 signaling (e.g., DCI) (e.g., the time domain resource allocation information may be indicated by a 'time domain resource allocation' field in the DCI). The terminal may obtain time domain resource allocation information about the PDSCH or PUSCH based on the DCI received from the base station.

When an entry having a K0/K2 value of 0 is indicated, this may mean that the PDCCH and the data channel are scheduled in the same slot. This will be referred to as "self-slot scheduling".

When an entry having a K0/K2 value greater than 0 is indicated, this may mean that the PDCCH and the data channel are scheduled in different slots. This will be referred to as "cross-slot scheduling".

In a wireless communication system (e.g., 5G or NR system), cross-slot scheduling may be used for the purpose of reducing the power consumption of the terminal. When cross-slot scheduling is supported, the terminal may operate in a sleep mode between the time of receiving the PDCCH and the time of data channel transmission/reception, thereby reducing the power consumption. Also, when cross-slot scheduling is supported, the terminal may have a long processing time for the PDCCH, thus reducing the power consumption by increasing the operation speed. Also, the terminal may finally obtain time domain scheduling information for the PDSCH when decoding is completed after receiving the PDCCH.

Thus, during the time interval for receiving and decoding the PDCCH, because the terminal may not know whether the PDSCH is scheduled, it may be necessary to perform buffering on OFDM symbols in which the PDSCH may be scheduled, which may greatly increase the power consumption of the terminal. When the terminal may pre-know the time domain resource allocation information for the PDSCH before decoding the PDCCH, that is, when it may pre-know that cross-slot scheduling is to be performed, the terminal may minimize buffering for OFDM symbols, thus reducing the power consumption.

In order to reduce the power consumption of the terminal, the base station may indicate, to the terminal, the minimum value of K0/K2 to be used in scheduling for the data channel through higher layer signaling or L1 signaling. The terminal may expect that scheduling will always be performed with a value of K0/K2 that is greater than or equal to the minimum value of K0/K2 received from the base station. For convenience of description, the minimum value for K0/K2 indicated by the base station to the terminal will be referred to as "minimum offset".

The terminal may receive the indication of the minimum offset value from the base station through DCI for scheduling the PDSCH or PUSCH (e.g., DCI format 1_1 or DCI format 0_1) or non-scheduling DCI (e.g., a new DCI format defined for the purpose of power reduction (e.g., WUS or GTS)) or DCI format 2_0 or DCI format 2_1). The terminal may separately receive different values with respect to the minimum offset value (K0min) for K0 and the minimum offset value (K2 min) for K2 from the base station or may receive one value as the minimum offset value (Kmin) for K0 and K2. In the disclosure, it is assumed that one minimum offset value Kmin is indicated; however, the contents of the disclosure may be similarly applied even when K0min and K2 min are separately indicated.

The terminal may receive the minimum offset value through the DCI transmitted from the base station at a particular time and may apply the contents of the received minimum offset value from the time after a particular time. For example, the terminal may receive an indication of the minimum offset value from the base station through the DCI received through the PDCCH transmitted in the slot n and may apply the contents of the obtained minimum offset value from the time of a slot n+k (k=0). Here, k (referred to as "application delay time") may be a predefined fixed value, may be a value configured by the base station to the terminal, may be the minimum K0 (or K2) value in the configured time domain resource allocation table, or may correspond to a value assumed by the terminal at the time before the slot n (ie, the minimum offset value received at the time before the slot n) or the like.

In an embodiment of the disclosure, when the minimum offset value received in the slot n is applied in the slot m, the slot m (=slot n+k) to which the minimum offset value is applied may be defined as a function of various system parameters. For example, "m" may be defined as follows.

$$m = \text{floor}((n+X) \cdot 2^{(\mu_1 - \mu_0)})$$ [Equation 1]

X=max(Y,Z)
Y: the minimum offset value assumed by the terminal in the slot n
Z: the redefined value (may vary depending on downlink subcarrier spacing)
$\mu_1$: the subcarrier spacing of the data channel (PDSCH or PUSCH)
$\mu_0$: the subcarrier spacing of the control channel (PDCCH)
floor(x): the function outputting the largest value among the integers less than "x"

According to another example, the time at which the minimum offset value is applied may be expressed as an offset k, it may be defined as k=m−n, or "k" may be defined as follows.

$$k = \text{floor}((X) \cdot 2^{(\mu_1 - \mu_0)})$$ [Equation 2]

X=max(Y,Z)
Y: the minimum offset value assumed by the terminal in the slot n
Z: the redefined value (may vary depending on downlink subcarrier spacing)
$\mu_1$: the subcarrier spacing of the data channel (PDSCH or PUSCH)
$\mu_0$: the subcarrier spacing of the control channel (PDCCH)
floor(x): the function outputting the largest value among the integers less than "x"

"k" may be expressed as Kapp below.

The above application delay time may be defined as an individual parameter with respect to the minimum offset value (K0min) for K0 and the minimum offset value (K2 min) for K2 or may be defined as one parameter with respect to one minimum offset value (Kmin) for K0 and K2. For example, in Equation 1 or Equation 2, the Y value may correspond to K0min or K2 min, and accordingly, the application delay time Kapp,0 may be defined with respect to K0 and the application delay time Kapp,2 for K2 may be defined with respect to K2. Alternatively, in Equation 1 or Equation 2, the Y value may correspond to one minimum offset value Kmin for K0 and K2, and accordingly, one application delay time Kapp may be defined with respect to K0 and K2. In the disclosure, it is assumed that one Kapp is used; however, the contents of the disclosure may be similarly applied even when Kapp is defined with respect to K0 and K2.

The meaning of applying the received minimum offset value may be understood as applying the interpretation of the time domain resource allocation table differently based on the received minimum offset value.

Embodiment 1-1

Hereinafter, a method of interpreting the time domain resource allocation table when the terminal receives an indication of the minimum offset value from the base station will be proposed. A method corresponding to at least one or a combination of one or more of the following methods may be applied.

[Method 1]

According to an embodiment of the disclosure, based on the minimum offset received from the base station, the terminal may expect that scheduling will be performed only with the entry in which the K0/K2 value is greater than or equal to the minimum offset among the preset time domain resource allocation table values. For example, when the time domain resource allocation table of Table 19 is configured in the terminal and the minimum offset value is indicated as 3, the terminal may expect that no scheduling will be performed with entries having a K0 value less than 3, that is, entry indexes 1, 2, 3, 4, 5, and 6, and may expect that scheduling will be performed with only the other entries, that is, entry indexes 7, 8, . . . , 16.

[Method 2]

According to an embodiment of the disclosure, based on the minimum offset received from the base station, the terminal may change the values, in which the K0/K2 value is less than the minimum offset, among the preset time domain resource allocation table values into the received minimum offset value. For example, when the time domain resource allocation table of Table 19 is configured in the terminal and the minimum offset value is indicated as 3, the terminal may assume the K0 value as 3 with respect to entries in which the K0 value is less than 3, that is, entry indexes 1, 2, 3, 4, 5, and 6. The terminal may use the other entries, that is, entry indexes 7, 8, . . . , 16, without changing the K0 value.

[Method 3]

According to an embodiment of the disclosure, based on the minimum offset received from the base station, the terminal may change the values, in which the K0/K2 value is less than the minimum offset, among the preset time domain resource allocation table values by adding the received minimum offset value. That is, the terminal may update and assume the preset K0 or K2 value as K0+minimum offset or K2+minimum offset. For example, when the time domain resource allocation table of Table 19 is configured in the terminal and the minimum offset value is indicated as 3, the terminal may perform an update by adding the minimum offset value of 3 to the K0 value configured with respect to the entries, in which the K0 value is less than 3, that is, the entry indexes 1, 2, 3, 4, 5, and 6.

[Method 4]

According to an embodiment of the disclosure, based on the minimum offset received from the base station, the terminal may perform a change by adding the received minimum offset value with respect to all the K0/K2 values in the preset time domain resource allocation table. That is, the terminal may update and assume all the preset K0 or K2 values as K0+minimum offset or K2+minimum offset. For example, when the time domain resource allocation table of Table 19 is configured in the terminal and the minimum offset value is indicated as 3, the terminal may perform an update by adding the indicated minimum offset value of 3 to all the K0 values.

[Method 5]

According to an embodiment of the disclosure, based on the minimum offset received from the base station, the terminal may expect that scheduling will be performed only with the entry in which the K0/K2 value is greater than or equal to the minimum offset among the preset time domain resource allocation table values. For example, when the time domain resource allocation table of Table 19 is configured in the terminal and the minimum offset value is indicated as 3, the terminal may expect that no scheduling will be performed with entries having a K0 value less than 3, that is, entry indexes 1, 2, 3, 4, 5, and 6, and may expect that scheduling will be performed with only the other entries, that is, entry indexes 7, 8, . . . , 16. For convenience of description, the following terms will be defined.

Valid entry: the entry that may be used for scheduling, as the entry in which the K0/K2 is greater than or equal to the received minimum offset among the preset time domain resource allocation table values Invalid entry: the entry that may not be used for scheduling, as the entry in which the K0/K2 is greater than or equal to the received minimum offset among the preset time domain resource allocation table values In performing the above method, when the minimum offset value received by the terminal from the base station is greater than all the K0/K2 values in the set time domain resource allocation table (or may correspond to a case where the minimum offset value received by the terminal from the base station is greater than the maximum value of K0/K2 in the configured time domain resource allocation table), any entry in any time domain resource allocation table configured in the terminal may not correspond to a valid entry. Thus, an additional terminal operation may need to be defined.

According to an embodiment of the disclosure, when the minimum offset value indicated by the base station to the terminal is greater than all the K0 (or K2) values in the configured time domain resource allocation table, the terminal may assume all the K0 (or K0) values in the configured time domain resource allocation table as the received minimum offset value.

According to an embodiment of the disclosure, when the minimum offset value indicated by the base station to the terminal is greater than all the K0 (or K2) values in the configured time domain resource allocation table, the terminal may determine the indicated content as an error. That is, the terminal may not expect that the minimum offset value from the base station will be indicated by a value greater than all the K0 (or K2) values in the configured time domain resource allocation table.

Embodiment 1-2

When the terminal has received the indication of a value for the minimum offset from the base station, scheduling based on the minimum offset value may not be considered in some cases. In other words, even when the minimum offset value is indicated, the terminal may expect that scheduling will be performed based on a preset time domain table.

For example, the minimum offset value may not be applied when monitoring in the following cases.

When the DCI format 1_0 scrambled by SI-RNTI will be monitored in the type-0 common search space When the DCI format 1_0 scrambled by SI-RNTI will be monitored in the type-O common search space When the DCI format 1_0 scrambled by RA-RNTI or TC-RNTI will be monitored in the type-4 common search space When the DCI format 1_0 scrambled by P-RNTI is monitored in the type-0 common search space, in the case of the PUSCH scheduled with a RAR (Random Access Response), the terminal may transmit a preamble (PRACH (Physical Random Access Channel)) in a random access process and then receive the RAR for the transmitted preamble. In this case, the terminal may be scheduled for the PDSCH corresponding to the RAR in the DCI format 1_0 scrambled by RA-RNTI in the common search space. The RAR message may include UL grant information about the PUSCH for transmitting a message 3. The UL grant for scheduling the PUSCH transmitted through the RAR may include time domain resource allocation information, and in this case, the terminal may not apply the above minimum offset value.

When the DCI format 1_0 scrambled by C-RNTI or MCS-C-RNTI or CS-RNTI is monitored in searchSpaceZero, searchSpaceSIB1, searchSpaceOtherSystemInformation, pagingSearchSpace, or ra-SearchSpace, the base station may receive a search space #0 (searchSpaceZero) through higher layer signaling PDCCH-ConfigCommon, a search space for receiving SIB1 (searchSpaceSIB1), a search space for receiving other system information (searchSpaceOtherSystemInformation), a search space for receiving paging (pagingSearchSpace), or a search space for receiving the RAR (ra-SearchSpace). When the terminal has been configured with one or more of the above search spaces from the base station and has been configured with at least one of C-RNTI, MCS-C-RNTI, or CS-RNTI, the terminal may monitor the DCI format 1_0 or the DCI format 0_0 scrambled by C-RNTI, MCS-C-RNTI, or CS-RNTI together when monitoring the PDCCH candidate for the DCI format 0_0 or 1_0 scrambled by SI-RNTI, RA-RNTI, or P-RNTI in the configured search spaces. In this case, the terminal may not apply the above minimum offset value.

In Embodiment 1, provided are various methods for allowing the base station not to relax the terminal's processing time during the PDCCH decoding time such as cross-slot scheduling or not to perform OFDM symbol buffering for a particular time period, for example, for several OFDM symbols or for several slots in order to save the power of the terminal. In the following description, for convenience, the expression similar to "when configured to perform cross-slot scheduling" or "when instructed to perform cross-slot scheduling" will refer to performing at least one of the power saving methods of the terminal.

Embodiment 2: Valid CSI Report Determination Method According to Cross-Slot Scheduling Embodiment 2 may provide a method of determining a valid CSI report according to cross-slot scheduling of the terminal.

As described above in Embodiment 1, the base station may perform configuration or indication such that the terminal may perform cross-slot scheduling in order to save the power of the terminal. After receiving the PDCCH for allocating the PDSCH or PUSCH according to cross-slot scheduling, the terminal may not perform buffering on OFDM symbols or may not relax the processing time (for PDSCH, PUSCH, or CSI) for at least some interval before starting to receive or transmit the corresponding PDSCH or PUSCH. For convenience of description, an interval in which the terminal may not relax the processing time or may not perform buffering on OFDM symbols will be referred to as a "power saving interval". It should be noted that the power saving interval may be replaced with various terms such as application delay time, minimum offset or offset for cross-slot scheduling, or OFDM symbol buffering stop interval or may be defined as a time interval less than or equal to the corresponding term.

When the terminal is configured or indicated to perform cross-slot scheduling from the base station to ensure the power saving interval, whether it is necessary to receive the CSI-RS transmitted in the power saving interval may be determined through at least one of the following methods.

[Method 1] In the first method, the terminal may not perform OFDM symbol buffering on the OFDM symbol in which an aperiodic (Ap) CSI-RS is transmitted in the power saving interval; however, it may be assumed that OFDM symbol buffering should be performed on the OFDM symbol in which a periodic (P) or semi-persistent (Sp) CSI is transmitted. In this case, when the terminal is indicated to transmit the Ap CSI-RS in the power saving interval, it may ignore the same and continue to perform the power saving operation or may omit the CSI report by not updating the CSI report or by ignoring the DCI having triggered the Ap CSI-RS without determining the CSI report associated with the Ap CSI-RS as a valid CSI report. On the other hand, when the Sp or P CSI-RS transmission is configured in the power saving interval, the terminal may perform reception prior to the power saving operation. This may mean that channel estimation and CSI generation for the Sp or P CSI-RS should be performed regardless of the power saving interval. When the PDSCH including the MAC CE indicating activation or deactivation of the Sp CSI-RS or the PDCCH including the DCI has been transmitted in the power saving interval or when the PDSCH including the RRC reconfiguration for the P CSI-RS or the Sp CSI-RS has been transmitted in the power saving interval, the terminal may ignore this (or the base station may ensure that the case does not occur). As an example, when the PDSCH including the MAC CE indicating activation or deactivation of the Sp CSI-RS has been transmitted in the power saving interval, because the terminal has not performed buffering on this, it may omit the HARQ-ACK feedback for the PDSCH. As another example, the terminal may not be requested to measure the P CSI-RS or the Sp CSI-RS transmitted in the power saving interval before the time at which decoding on "the PDSCH including the MAC CE indicating activation or deactivation of the Sp CSI-RS" or "the PDSCH including the RRC reconfiguration for the P CSI-RS or the Sp CSI-RS" is terminated. Accordingly, the terminal may ensure the causality for the buffering operation in the power saving interval by CSI-RS activation/deactivation or reconfiguration.

In the following description, not determining a certain CSI report as a valid CSI report, ignoring the CSI triggering DCI, or omitting the CSI report may be replaced with various terminal operations such as dropping or discarding the CSI report indicated by the triggering DCI or not expecting the corresponding configuration or instruction by the terminal. In the following description, it is omitted to emphasize that one of the above various terminal operations may be replaced with another operation in order not to obscure the subject matter; however, one of the various terminal operations may also be replaced with another operation in the following description.

[Method 2] In the second method, the terminal may assume that OFDM symbol buffering may not be performed on the OFDM symbol in which the Ap/Sp/P CSI-RS is transmitted regardless of the time domain behavior of the CSI-RS in the power saving interval. According to the second method, when the Ap/Sp/P CSI-RS transmission is indicated in the power saving interval, the terminal may ignore this and continue to perform the power saving operation. Also, the terminal may not determine the CSI report associated with the Ap CSI-RS as a valid CSI report and may exclude the CSI-RS resource overlapping the power saving interval in the process of calculating the latest CSI-RS resource before the CSI reference resource, in the case of the CSI report associated with the Sp/P CSI-RS.

[Method 3] In the third method, when the minimum offset is not applied in a particular condition as in Embodiment 1-2, the terminal may perform reception and channel estimation on the CSI-RS resource overlapping the power saving interval in the corresponding condition, and when the minimum offset is applied, the terminal may not perform reception and channel estimation on the CSI-RS resource overlapping the power saving interval. For example, when monitoring a PDCCH candidate for the DCI format 0_0 or 1_0 scrambled by SI-RNTI, RA-RNTI, or P-RNTI, the terminal may buffer or receive the corresponding OFDM symbol even when the corresponding period overlaps with the power saving interval. The corresponding interval may be defined in OFDM symbol units or may be defined in slot units (that is, when monitoring a PDCCH candidate for the DCI format 0_0 or 1_0 scrambled by SI-RNTI, RA-RNTI, or P-RNTI in at least one OFDM symbol in the slot, it may be determined that the entire slot overlaps the power saving interval). In this case, when the CSI-RS is transmitted in the corresponding interval, the terminal may perform a conventional CSI reporting operation without ignoring the DCI triggering the corresponding CSI-RS or excluding the corresponding CSI-RS in the process of calculating the latest CSI-RS resource before the CSI reference resource.

In the above methods, it is assumed that the terminal may omit reception of the aperiodic CSI-RS in the power saving interval; however, this may be limited to the aperiodic CSI-RS triggered by the UE-specific DCI and may not be applied to the aperiodic CSI-RS triggered by the group-common (GC) DCI. This may mean that, when a certain aperiodic CSI-RS is triggered by the GC DCI, the terminal may have to perform the corresponding CSI report after receiving this even when it overlaps the power saving interval.

When the terminal is configured or indicated to perform cross-slot scheduling from the base station to ensure the power saving interval, whether there is a valid CSI report may be determined through at least one of the following methods. Accordingly, it may be possible to ensure an operation of the terminal in the power saving interval, such as when the minimum scheduling offset is shorter than the CSI processing time $T_{proc,CSI}$.

[Method 1] The first method may be a method of ensuring the power saving operation of the terminal in the power saving interval by adding a particular constraint when calculating the $T_{proc,CSI}$ value for defining the above Zref symbol. Regarding the particular constraint, for example, "when the terminal performs cross-slot scheduling, it may be ensured not to use a Z or Z' value smaller than the length of the minimum offset or the power saving interval" or "when the terminal is configured/indicated to apply the minimum offset or apply the power saving interval, it may be ensured not to use the Z or Z' value (e.g., $Z_1$ or $Z_1'$) of the length shorter than a particular value" or "when the terminal is configured/indicated to apply the minimum offset or apply the power saving interval, it may be ensured not to use a delay requirement (e.g., the delay requirement 1) of the length shorter than a particular value, various applications may be applied such that the scheduling minimum offset or the power saving interval may be sufficiently longer than the CSI processing time and thus the terminal may perform a power saving operation in the power saving interval.

Figure 11:
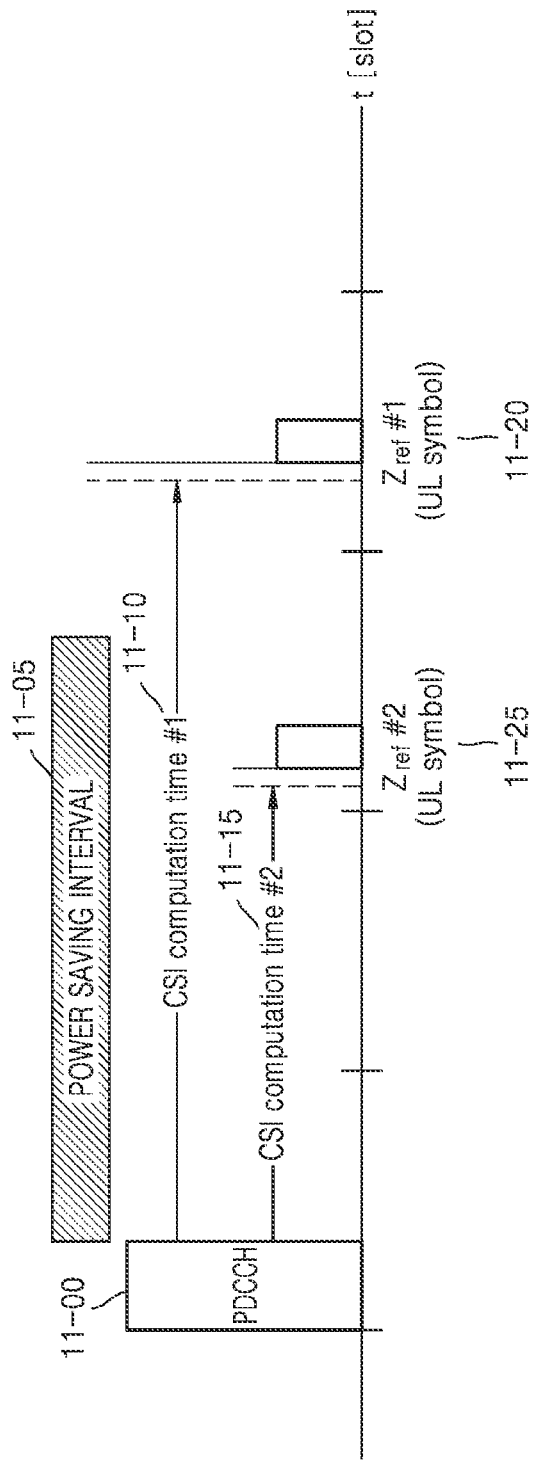
FIG. 11 is a diagram illustrating an example of a valid CSI report determining method considering a power saving interval, according to some embodiments.

FIG. 11 is a diagram illustrating an example of a valid CSI report determining method considering a power saving interval, according to some embodiments.

Referring to FIG. 11, when there is a power saving interval 11-05 of the terminal after triggering DCI 11-00, the terminal may assume that a CSI computation time 11-15 of a certain CSI report is shorter than the power saving interval 11-05 according to a Z or Z' value for each condition and thus a Zref symbol (Zref #2) 11-25 of the corresponding CSI report is before the end time of the power saving interval, and a CSI computation time 11-10 of another type of CSI report is longer than the power saving interval 11-05 and thus a Zref symbol (Zref #1) 11-20 of the corresponding CSI report is after the end time of the power saving interval. In this case, the base station and the terminal may promise such that the PUCCH or PUSCH transmission for the corresponding CSI report may not be earlier than the end time (OFDM symbol position) of the power saving interval 11-05 even when the time (OFDM symbol position) of the Zref #2 for the CSI report with a similar condition to that of the Zref #2 11-25 is earlier than the end time (OFDM symbol position) of the power saving interval 11-05. As another example, the base station and the terminal may determine that the power saving operation of the terminal is not performed in the corresponding power saving interval when the time (OFDM symbol position) of the Zref #2 for the CSI report with a condition similar to that of the Zref #2 11-25 is earlier than the end time (OFDM symbol position) of the power saving interval 11-05. As another example, the base station and the terminal may determine that the power saving operation of the terminal may be performed in the corresponding power saving interval and the update of the corresponding CSI report may not be performed when the time (OFDM symbol position) of the Zref #2 for the CSI report with a condition similar to that of the Zref #2 11-25 is earlier than the end time (OFDM symbol position) of the power saving interval 11-05.

[Method 2] The first method may be a method of changing the calculation method by considering the power saving operation of the terminal in the power saving interval when calculating the $T_{proc,CSI}$ value for defining the above Zref symbol. The $T_{proc,CSI}$ change method may be, for example, a method of defining $Z_{PowSav}$ in $T_{proc,CSI}=(Z_{PowSav})(2048+144)\cdot\kappa 2^{-\mu}\cdot T_C$ as the function of Z described above and adding an additional margin value ($\Delta$) in a particular condition. In this case, other parameters such as $T_c$, $\kappa$, and $\mu$ may follow the above description. Particularly, $Z_{PowSav}$ may be defined as the maximum value among the sum of Z or $\Delta$ values of different values according to the situation as in $$Z_{powsav} = \max_{m=0,\ldots,M-1}(Z(m)+\Delta_m)$$

or may be "a method of adding a single value of $\Delta$ to the conventional Z value such as $Z_{PowSav}=Z+\Delta$". When defined as "the maximum value among the sum of Z or $\Delta$ values of different values according to the situation as in $$Z_{powsav} = \max_{m=0,\ldots,M-1}(Z(m)+\Delta_m),$$

$\Delta_m$ may be a margin value that is promised differently for each configuration, each type of the report such as the time domain behavior of the report, each numerology, each bandwidth part, each cell, each delay requirement, or each value of Z/Z' or is configured by higher layer signaling. In this case, $\Delta_m$ may be a positive integer including 0. In the case of "a method in which a single value of $\Delta$ is added to the conventional Z value like $Z_{powsav}=Z+\Delta$", $\Delta$ may be a positive integer of a predetermined value or a value configured as an upper layer. When configured by the base station to apply the corresponding value, the above $\Delta_m$ or $\Delta$ may be collectively applied regardless of the condition, or even when the base station is configured to apply the corresponding value, it may be applied only in a particular additional condition, for example, when the terminal applies a power saving interval. The above method may be used to determine the Zref symbol after changing $T_{proc,CSI}$ according to one of the above methods.

Figure 12:
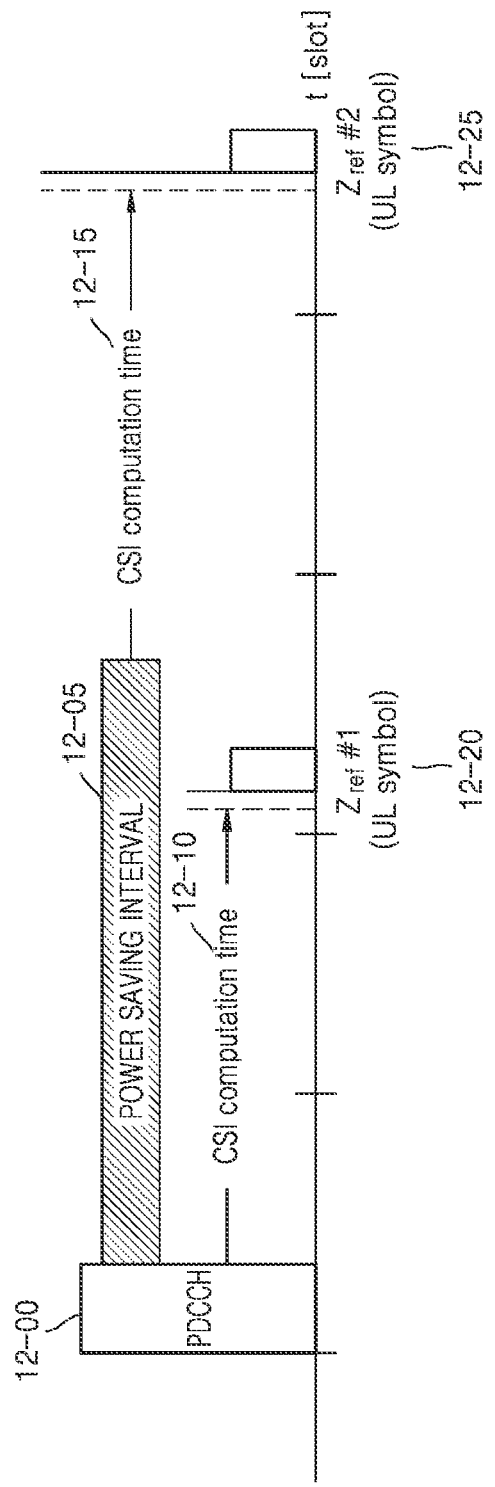
FIG. 12 is a diagram illustrating an example of a CSI computation time changing method considering a power saving interval, according to some embodiments.

FIG. 12 is a diagram illustrating an example of a CSI computation time changing method considering a power saving interval, according to some embodiments.

Referring to FIG. 12, the terminal may calculate a CSI computation time 12-10 from a triggering PDCCH 12-00 according to the conventional $T_{proc,CSI}$ calculation method and may identify the position of a Zref #1 12-20 symbol therefrom. In this case, when the end point of a power saving interval 12-05 overlaps a portion of the CSI computation time 12-10, the terminal may extend a CSI computation time 12-15 by considering the length (the absolute time or the number of OFDM symbols) of the power saving interval 12-05 and may determine whether there is a valid CSI report based on a Zref #2 12-25 according to the extension. Accordingly, the terminal may perform a power saving operation in the power saving interval regardless of the CSI report.

In the description of the disclosure, "the terminal is ensured with the condition A" may be interpreted as various meanings such as "do not expect that the condition A is not satisfied", "do not perform an operation related to the condition A when the condition A is not satisfied", or "ignore a base station indication related to the condition A when the condition A is not satisfied. Also, the above description will not be repeated in order not to obscure the gist of the following description.

In the description of the disclosure, "the terminal performs a power saving operation" may be interpreted as various meanings such as "relaxes the processing time of the terminal" or "may not perform OFDM symbol buffering" in the power saving interval. Also, the above description will not be repeated in order not to obscure the gist of the following description.

Embodiment 3: CSI Reference Resource Determination Method According to Cross-Slot Scheduling Embodiment 3 may provide a method of determining a CSI reference resource according to cross-slot scheduling.

As described above, with respect to the CSI reporting transmitted in the uplink slot n', the downlink slot n-$n_{CSI-ref}$ or the latest valid downlink slot among the previous slots may be defined as a CSI reference resource. In this case, it may be determined that a slot not satisfying any one of the following two conditions is not a valid downlink slot and thus it may not be selected as a CSI reference resource. First, the valid downlink slot should include at least one upper-layer configured downlink symbol or flexible symbol. Second, the valid downlink slot should not overlap a measurement gap configured for handover of the terminal or the like. When there is no valid downlink slot for the CSI reporting in a certain serving cell, the terminal may omit the CSI reporting for the corresponding serving cell in the uplink slot n'.

After an operation such as newly configuring or reconfiguring a CSI report, or activating a serving cell, or changing a bandwidth part (BWP change), or activating semi-persistent CSI, the terminal may report the CSI only when at least one CSI-RS and/or CSI-IM transmission is received at the time not later than the CSI reference resource and may drop the CSI otherwise.

When discontinuous reception (DRX) is configured, the terminal may report the CSI only when at least one CSI-RS and/or CSI-IM transmission is received in the DRX active time at the time not later than the CSI reference resource and may drop the CSI otherwise.

When cross-slot scheduling is configured, the terminal may report the CSI only when at least one CSI-RS and/or CSI-IM transmission is received in other intervals than the power saving interval at the time not later than the CSI reference resource and may drop the CSI otherwise. In the above condition, cross-slot scheduling may be replaced with various terms such as the minimum offset, the power saving interval, and the application delay time when actually applied.

---

Time domain: a single downlink slot n − $n_{CSI\_ref}$ for a CSI reporting in uplink slot n'
  CSI reference resource shall correspond to a valid downlink slot
    it comprises at least one higher layer configured downlink or flexible symbol
    it does not fall within a configured measurement gap for that UE
  If there is no valid downlink slot for the CSI reference resource corresponding to a CSI Report Setting in a serving cell, CSI reporting is omitted for the serving cell in uplink slot n'.
Restrictions on CSI reference resource
  (As is) After the CSI report (re)configuration, serving cell activation, BWP change, or activation of SP-CSI, the UE reports a CSI report only after receiving at least one CSI-RS and/or CSI-IM transmission occasion no later than CSI reference resource and drops the report otherwise.
  (As is) When DRX is configured, the UE reports a CSI report only if receiving at least one CSI-RS and/or CSI-IM transmission occasion in DRX Active Time no later than CSI reference resource and drops the report otherwise.
  (As is) When deriving CSI feedback, the UE is not expected that a NZP CSI-RS resource for channel measurement overlaps with CSI-IM or NZP CSI-RS resource for interference measurement.
  (Proposal) When power saving (or cross-slot scheduling) is configured, the UE may not measure the CSI-RS and/or CSI-IM overlaps with a given period (or the UE may omit the CSI report if ¯)
    The given period above can be determined by UE relaxation time (application delay) duration in slide 4 or 5

---

Embodiment 4: CPU Occupation Time Calculation Method According to Cross-Slot Scheduling Embodiment 4 may provide CPU occupation time calculation methods according to cross-slot scheduling.

Figure 13:
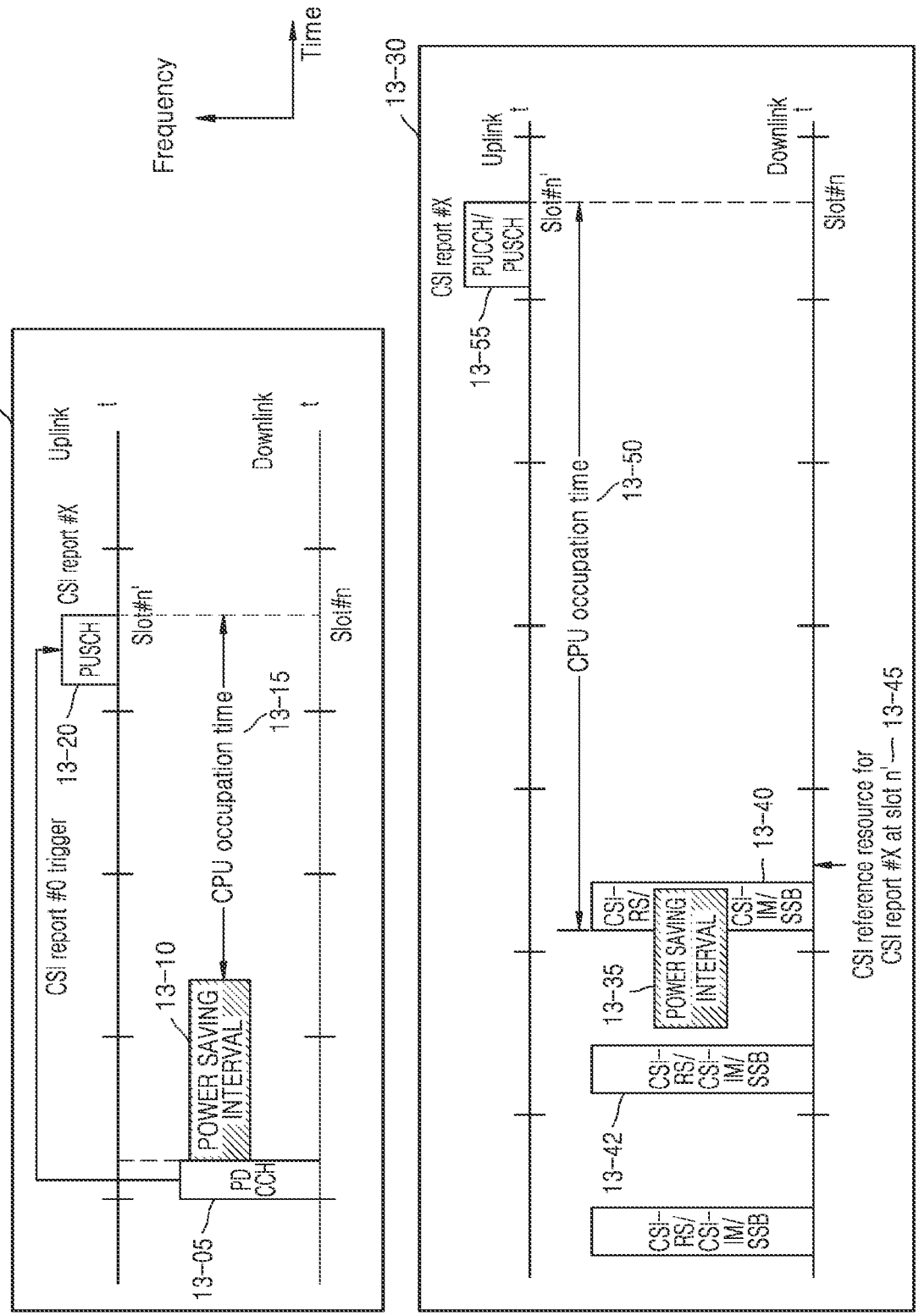
FIG. 13 is a diagram illustrating an example of a CPU occupation time changing method considering a power saving interval, according to some embodiments.

FIG. 13 is a diagram illustrating an example of a CPU occupation time changing method considering a power saving interval, according to some embodiments. FIG. 13 illustrates an example of a CPU occupation time for a CSI report in which a report quantity included in the CSI report is not configured as 'none'.

Referring to FIG. 13, as illustrated in 13-00, when the base station indicates to transmit an aperiodic CSI report #X in the uplink slot n' through the DCI using the DCI format 0_1, the CPU occupation time 13-15 for the CSI report #X transmitted in the uplink slot n' may be defined as the time from the symbol next the last symbol occupied by the power saving interval 13-10 to the last symbol occupied by the PUSCH 13-20 including the CSI report #X transmitted in the uplink slot n'. Accordingly, it may be ensured that the terminal may reserve decoding of the DCI indicating an aperiodic CSI report #X in the power saving interval 13-10, and it may be possible to match the understandings between the terminal and the base station on whether to drop the CSI reporting in the power saving interval 13-10. In this case, the changed CPU occupation time 13-15 may be promised to satisfy the above Z and Z values according to the condition, and otherwise, the terminal may drop or may not update the CSI report in the PUSCH 13-20.

13-30 of FIG. 13 is a diagram illustrating a CPU occupation time for a periodic or semi-persistent CSI report in which a report quantity included in the CSI report is not configured as 'none', according to some embodiments. When the base station indicates to transmit a periodic or semi-persistent CSI report #X in the uplink slot n' through the higher layer signaling or the DCI using the DCI format 0_1 scrambled by SP-CSI-RNTI, the CPU occupation time 13-50 for the CSI report #X transmitted in the uplink slot n' may be defined as the time from the first symbol of the first-transmitted CSI-RS/CSI-IM/SSB resource corresponding to the latest CSI-RS/CSI-IM/SSB occasion 13-40 before the CSI reference resource 13-45 among the CSI-RS/CSI-IM/SSB occasions for the CSI report #X transmitted in the uplink slot n' to the last symbol occupied by the PUCCH or PUSCH 13-55 including the CSI report #X transmitted in the uplink slot n'. In this case, when the power saving interval 13-35 and the CSI-RS/CSI-IM/SSB occasion 13-40 overlap each other, the base station and the terminal may select at least one of the following methods to determine the CPU occupation time for the CSI report #X 13-55.

[Method 1]: The base station and the terminal may exclude the CSI-RS/CSI-IM/SSB resource(s) overlapping the power saving interval in determining the first-transmitted CSI-RS/CSI-IM/SSB resource corresponding to the latest CSI-RS/CSI-IM SSB occasion before the CSI reference resource 13-45 among the CSI-RS/CSI-IM/SSB occasions for the CSI report #X transmitted in the uplink slot n' described above. In the example of FIG. 13, because the CSI-RS/CSI-IM/SSB resource 13-40 overlapping the power saving interval is excluded, the latest CSI-RS/CSI-IM/SSB resource 13-42 among the previous resources may be selected and accordingly the CPU occupation time may increase suitably by the interval between the CSI-RS/CSI-IM/SSB resource (13-40) and the latest CSI-RS/CSI-IM/SSB resource (13-42) compared to the conventional CPU occupation time (13-50). Accordingly, the terminal may secure an additional CPU occupation time according to the application of the power saving interval.

[Method 2]: The base station and the terminal may exclude the CSI-RS/CSI-IM/SSB resource(s) overlapping the power saving interval in determining the first-transmitted CSI-RS/CSI-IM/SSB resource corresponding to the latest CSI-RS/CSI-IM SSB occasion before the CSI reference resource 13-45 among the CSI-RS/CSI-IM/SSB occasions for the CSI report #X transmitted in the uplink slot n' described above. In the example of FIG. 13, because the CSI-RS/CSI-IM/SSB resource 13-40 overlapping the power saving interval is excluded, the latest CSI-RS/CSI-IM/SSB resource 13-42 among the previous resources may be selected and accordingly the CPU occupation time 13-50 may not be counted as the actual CPU occupation time. This may be to match the understandings of actual CPU usage between the base station and the terminal by reflecting that the CSI computation is not performed because the CSI report for the CSI-RS/CSI-IM/SSB resource 13-40 in the CSI report #X 13-55 is dropped or the update thereof is omitted.

Exceptionally, when the base station indicates the semi-persistent CSI report through the DCI and thus the terminal performs the first CSI report of the semi-persistent CSI report #X, the CPU occupation time for the first CSI report may be defined as the time from the symbol next the last symbol occupied by the PDCCH including the DCI indicating the semi-persistent CSI report #X to the last symbol occupied by the PUSCH including the first CSI report. Accordingly, the operation causality on the time axis of the terminal may be ensured by considering the time at which the CSI report is indicated and the time at which the CPU occupation time starts.

Figure 14:
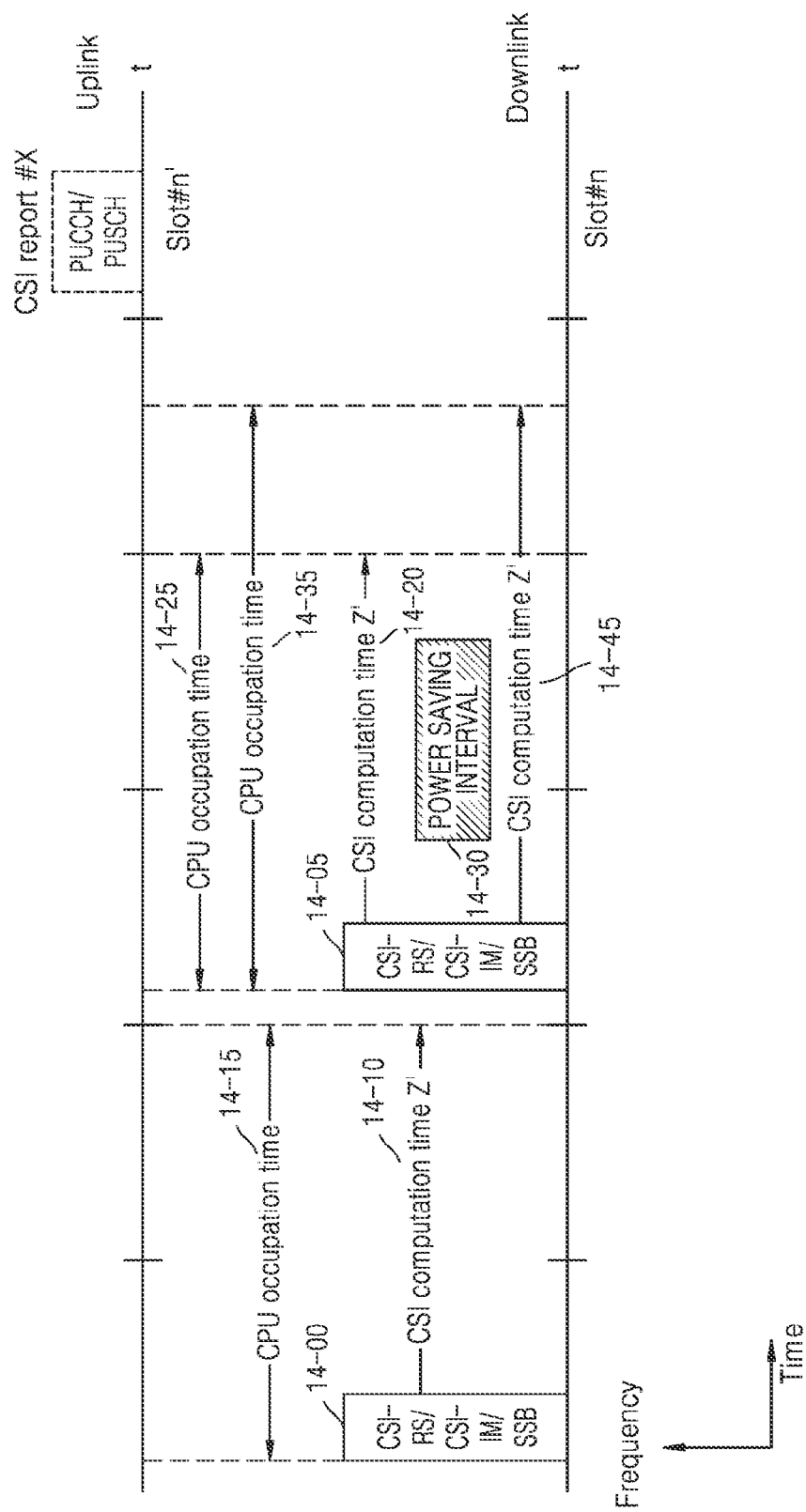
FIG. 14 is a diagram illustrating another example of a CPU occupation time changing method considering a power saving interval, according to some embodiments.

FIG. 14 is a diagram illustrating another example of a CPU occupation time changing method considering a power saving interval, according to some embodiments. FIG. 14 illustrates an example of a CPU occupation time for a CSI report in which a report quantity included in the CSI report is configured as 'none'.

When the base station indicates to transmit a periodic or semi-persistent CSI report #X in the uplink slot n' through the higher layer signaling or the DCI using the DCI format 0_1 scrambled by SP-CSI-RNTI, the CPU occupation time 14-15 for the CSI report #X transmitted in the uplink slot n' may be defined as the time from the first symbol of the first-transmitted CSI-RS/CSI-IM/SSB resource corresponding to each CSI-RS/CSI-IM/SSB occasion 14-00 transmitted in the uplink slot n' to the symbol after the CSI computation time Z' 14-10 of the last symbol of the latest-transmitted CSI-RS/CSI-IM/SSB resource. In this case, when the power saving interval 14-30 in the interval of the conventional CSI computation time Z' 14-20 after any CSI-RS/CSI-IM/SSB occasion 14-05 overlaps, the terminal and the base station may increase the CSI computation time Z' 14-45 by considering the corresponding power saving interval. This may mean that the CPU occupation time may increase in the corresponding case (14-35), and the increased value may be determined as a function of the length value or the existence or non-existence of the power saving interval 14-30. As an example, the value of the CSI computation time 14-45 to be adjusted may be the sum of the conventional CSI computation time 14-20 and the length value of the power saving interval 14-30.

Figure 15:
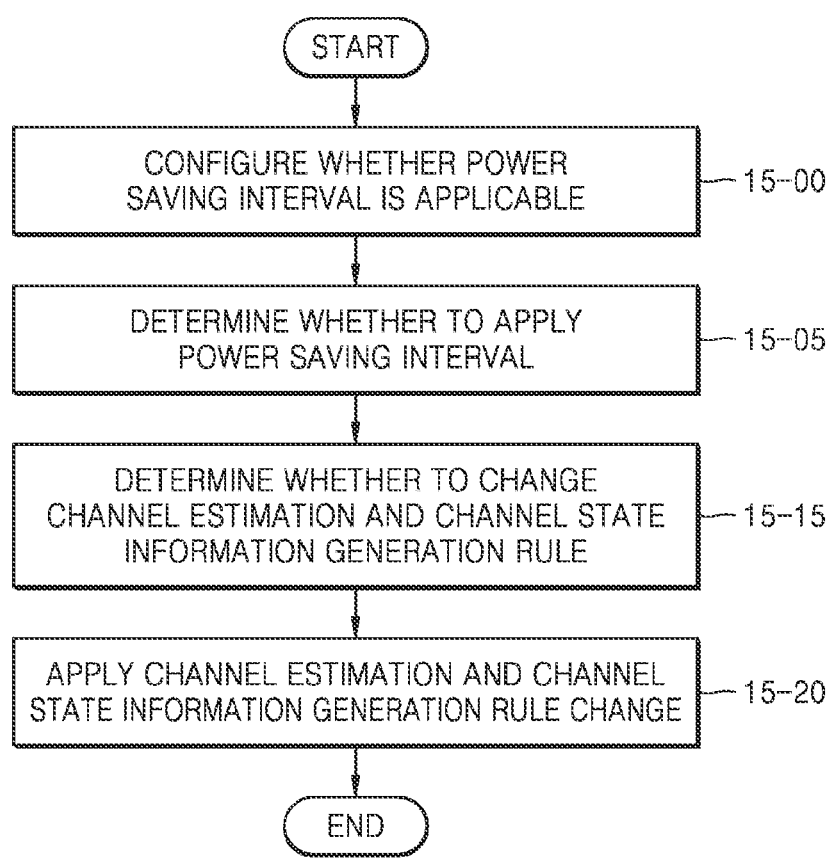
FIG. 15 is a diagram illustrating an example of an operation sequence of a base station and a terminal according to some embodiments.

FIG. 15 is a diagram illustrating an example of an operation sequence of a base station and a terminal according to some embodiments.

Referring to FIG. 15, the base station may configure whether the power saving interval may be applied, for the terminal based on the power saving-related capability report of the terminal (15-00). Thereafter, the base station and the terminal may determine whether to apply the power saving interval by using at least one of the methods of Embodiment 1 (15-05). When it is determined that the power saving interval is to be applied, the base station and the terminal may determine whether to change the channel estimation and channel state information generation rule by using at least one of the methods of Embodiments 2 to 4 (15-15). Thereafter, the base station and the terminal may apply the changed channel estimation and channel state information generation rule (15-20). The terminal may provide the base station with the channel state information obtained based on the channel estimation and channel state information generation rule determined in operation 15-15.

Figure 16:
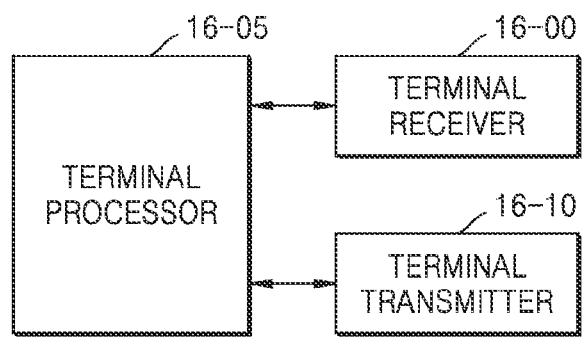
FIG. 16 is a block diagram illustrating a structure of a terminal according to some embodiments.

FIG. 16 is a block diagram illustrating a structure of a terminal according to some embodiments.

Referring to FIG. 16, the terminal may include a terminal receiver 16-00, a terminal transmitter 16-10, and a terminal processor 16-05. The terminal receiver 16-00 and the terminal transmitter 16-10 may be collectively referred to as a transceiver. The terminal receiver 16-00, the terminal transmitter 16-10, and the terminal processor 16-05 of the terminal may operate according to the communication method of the terminal described above. However, the components of the terminal are not limited thereto. For example, the terminal may include more components (e.g., a memory or the like) or fewer components than the above components. In addition, the terminal receiver 16-00, the terminal transmitter 16-10, and the terminal processor 16-05 may be implemented in the form of a single chip.

The terminal receiver 16-00 and the terminal transmitter 16-10 may transmit/receive signals to/from the base station. Here, the signals may include control information and data. The terminal receiver 16-00 and the terminal transmitter 16-10 may be collectively referred to as a transceiver. For this purpose, the transceiver may include, for example, an RF transmitter for up-converting and amplifying a transmitted signal and an RF receiver for low-noise-amplifying and down-converting a received signal. However, this is merely an embodiment of the transceiver, and the components of the transceiver are not limited to the RF transmitter and the RF receiver.

Also, the transceiver may receive a signal through a radio channel and output the signal to the terminal processor 16-05 and may transmit a signal output from the terminal processor 16-05, through a radio channel.

A memory (not illustrated) may store programs and data necessary for the operation of the terminal. Also, the memory may store control information or data included in the signals obtained by the terminal. The memory may include a storage medium or a combination of storage media such as ROM, RAM, hard disk, CD-ROM, and DVD.

The terminal processor 16-05 may control a series of processes such that the terminal may operate according to the above embodiments of the disclosure. The terminal processor 16-05 may be implemented as a controller or one or more processors.

Figure 17:
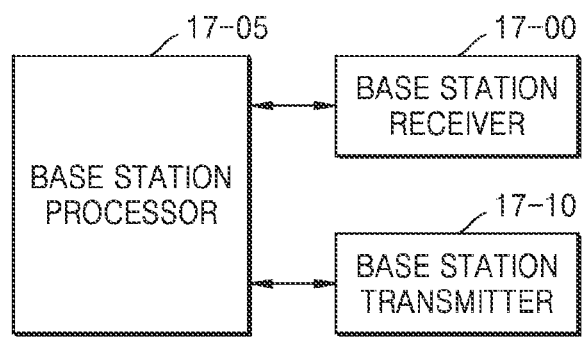
FIG. 17 is a block diagram illustrating a structure of a base station according to some embodiments.

FIG. 17 is a block diagram illustrating a structure of a base station according to some embodiments.

Referring to FIG. 17, the base station may include a base station receiver 17-00, a base station transmitter 17-10, and a base station processor 17-05. The base station receiver 17-00 and the base station transmitter 17-10 may be collectively referred to as a transceiver. The base station receiver 17-00, the base station transmitter 17-10, and the base station processor 17-05 of the base station may operate according to the communication method of the base station described above. However, the components of the base station are not limited thereto. For example, the base station may include more components (e.g., a memory or the like) or fewer components than the above components. In addition, the base station receiver 17-00, the base station transmitter 17-10, and the base station processor 17-05 may be implemented in the form of a single chip.

The base station receiver 17-00 and the base station transmitter 17-10 (or the transceiver) may transmit/receive signals to/from the terminal. Here, the signals may include control information and data. For this purpose, the transceiver may include, for example, an RF transmitter for up-converting and amplifying a transmitted signal and an RF receiver for low-noise-amplifying and down-converting a received signal. However, this is merely an embodiment of the transceiver, and the components of the transceiver are not limited to the RF transmitter and the RF receiver.

Also, the transceiver may receive a signal through a radio channel and output the signal to the base station processor 17-05 and may transmit a signal output from the base station processor 17-05, through a radio channel.

A memory (not illustrated) may store programs and data necessary for the operation of the base station. Also, the memory may store control information or data included in the signals obtained by the base station. The memory may include a storage medium or a combination of storage media such as ROM, RAM, hard disk, CD-ROM, and DVD.

The base station processor 17-05 may control a series of processes such that the base station may operate according to the above embodiments of the disclosure. The base station processor 17-05 may be implemented as a controller or one or more processors.

It should be understood that the embodiments of the disclosure described herein should be considered in a descriptive sense only and not for purposes of limitation. That is, it will be understood by those of ordinary skill in the art that various changes in form and details may be made in the embodiments of the disclosure without departing from the scope of the disclosure. Also, the embodiments of the disclosure may be operated in combination when necessary. For example, the base station and the terminal may be operated according to a combination of portions of Embodiments 1 to 4 of the disclosure.

The invention claimed is:

1. A method, performed by a terminal, of providing channel state information in a wireless communication system, the method comprising:
receiving, from a base station, resource allocation information;
determining a power saving interval based on the resource allocation information;
identifying whether a message indicating activation or deactivation of a semi-persistent channel state information reference signal (CSI-RS) is received in the power saving interval through a physical downlink shared channel (PDSCH); and
transmitting, to the base station, via a physical uplink shared channel (PUSCH), an uplink message including channel state information based on at least one of the message or the power saving interval,
wherein in case that the message is received in the power saving interval, the uplink message is transmitted to the base station without hybrid automatic repeat request (HARQ)-acknowledgment (ACK) information about the PDSCH.

2. The method of claim 1, further comprising:
determining that a report associated with an aperiodic CSI-RS is not valid, in case that at least one of the aperiodic CSI-RS, a periodic CSI-RS, or the semi-persistent CSI-RS is indicated to be received in the power saving interval; and
obtaining the channel state information based on at least one of the periodic CSI-RS or the semi-persistent CSI-RS.

3. The method of claim 2, further comprising
receiving, from the base station, signaling indicating deactivation of the periodic CSI-RS or the semi-persistent CSI-RS,
wherein when the signaling is received through a physical downlink control channel (PDCCH), channel estimation based on the periodic CSI-RS or the semi-persistent CSI-RS is omitted, and omitting.

4. The method of claim 1, further comprising omitting channel estimation based on a CSI-RS received in the power saving interval.

5. The method of claim 1, further comprising:
identifying a PDCCH candidate interval for particular downlink control information (DCI) scrambled by a system information radio network temporary identifier (SI-RNTI), a random access (RA)-RNTI, or a paging (P)-RNTI; and performing, when a minimum offset is not applied, channel estimation based on a CSI-RS received in the power saving interval, wherein when the minimum offset is applied, channel estimation based on a CSI-RS received in the power saving interval is omitted.

6. The method of claim 1, further comprising omitting, when an aperiodic CSI-RS is triggered based on a group common DCI, channel estimation based on the aperiodic CSI-RS in the power saving interval, and performing, when the aperiodic CSI-RS is triggered based on user equipment (UE)-specific DCI, channel estimation based on the aperiodic CSI-RS.

7. The method of claim 1, further comprising determining, as a CSI reference resource, a symbol not overlapping a measurement gap among at least one downlink symbol configured through higher layer signaling, wherein transmitting the uplink message including the channel state information comprises providing channel state information at a time not later than the CSI reference resource, based on at least one CSI-RS received in an interval other than the power saving interval.

8. The method of claim 7, further comprising:

identifying a resource of a first-transmitted CSI-RS, CSI-interference measurement (IM), or synchronization signal (SS)/physical broadcast channel (PBCH) block (SSB) with respect to a latest CSI-RS, CSI-IM, or SSB before the CSI reference resource in an interval excluding the power saving interval; and determining an interval from the identified resource to a last symbol of a physical uplink control channel (PUCCH) or physical uplink shared channel (PUSCH) configured with the channel report as a CPU occupation time.

9. The method of claim 7, further comprising:

identifying a resource of a first-transmitted CSI-RS, CSI-IM, or SSB with respect to a latest CSI-RS, CSI-IM, or SSB before the CSI reference resource in an interval excluding the power saving interval; and determining an interval from the identified resource to a last symbol before the power saving interval as a CPU occupation time.

10. The method of claim 7, further comprising:

identifying an interval from a first symbol of a first-transmitted CSI-RS, CSI-IM, or SSB to a last symbol of a latest-transmitted CSI-RS, CSI-IM, or SSB for a channel state report in an uplink slot indicated for a channel state report from the base station; and determining a CPU occupation time by changing a length of the identified interval based on a length of the power saving interval when the power saving interval is in the identified interval.

11. The method of claim 1, further comprising determining, when configured to transmit a channel report to the base station, an interval from a symbol next a last symbol occupied by the power saving interval to a last symbol of the PUSCH configured with the channel report as a central processing unit (CPU) occupation time.

12. A method, performed by a base station, of providing channel state information in a wireless communication system, the method comprising:

transmitting, to a terminal, resource allocation information, wherein a power saving interval is based on the resource allocation information;

transmitting, to the UE, a message indicating activation or deactivation of a semi-persistent channel state information reference signal (CSI-RS) in the power saving interval through a physical downlink shared channel (PDSCH); and receiving, from the terminal, via a physical uplink shared channel (PUSCH), an uplink message including channel state information based on at least one of the message or the power saving interval, wherein in case that the message is received in the power saving interval, the uplink message is transmitted to the base station without hybrid automatic repeat request (HARQ)-acknowledgment (ACK) information about the PDSCH.

13. A terminal for providing channel state information in a wireless communication system, the terminal comprising:

a memory;

a transceiver; and at least one processor configured to control the transceiver to receive, from a base station, resource allocation information, determine a power saving interval based on the resource allocation information, identify whether a message indicating activation or deactivation of a semi-persistent channel state information reference signal (CSI-RS) is received in the power saving interval through a physical downlink shared channel (PDSCH), and control the transceiver to transmit, to the base station, via a physical uplink shared channel (PUSCH), an uplink message including channel state information based on at least one of the message or the power saving interval, wherein in case that the message is received in the power saving interval, the uplink message is transmitted to the base station without hybrid automatic repeat request (HARQ)-acknowledgment (ACK) information about the PDSCH.

14. The terminal of claim 13, wherein the at least one processor is configured to determine that a report associated with an aperiodic CSI-RS is not valid, in case that at least one of the aperiodic CSI-RS, a periodic CSI-RS, or the semi-persistent CSI-RS is indicated to be received in the power saving interval, and obtain the channel state information based on at least one of the periodic CSI-RS or the semi-persistent CSI-RS.

15. The terminal of claim 13, wherein the at least one processor is configured to omit channel estimation based on a CSI-RS received in the power saving interval.

* * * * *